United States Patent
Igeta

(10) Patent No.: US 11,726,363 B2
(45) Date of Patent: Aug. 15, 2023

(54) LIQUID CRYSTAL ELEMENT

(71) Applicant: Japan Display Inc., Tokyo (JP)

(72) Inventor: Koichi Igeta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,684

(22) Filed: Mar. 21, 2022

(65) Prior Publication Data

US 2022/0308394 A1     Sep. 29, 2022

(30) Foreign Application Priority Data

Mar. 25, 2021   (JP) .................................. 2021-051981

(51) Int. Cl.
  *G02F 1/1335*     (2006.01)
  *G02F 1/1337*     (2006.01)

(52) U.S. Cl.
  CPC .. *G02F 1/133553* (2013.01); *G02F 1/133738* (2021.01); *G02F 1/133746* (2021.01); *G02F 2201/343* (2013.01)

(58) Field of Classification Search
  CPC ......... G02F 1/133553; G02F 2201/343; G02F 1/133738; G02F 1/133746; H02S 40/22; H01L 31/054
  See application file for complete search history.

(56) References Cited

U.S. PATENT DOCUMENTS

| 2003/0142256 A1* | 7/2003 | Maeda ................. G02B 5/3016 349/115 |
| 2013/0050622 A1* | 2/2013 | Yoshihara ............... B32B 38/06 349/123 |
| 2022/0299825 A1* | 9/2022 | Kobashi ............ G02F 1/133738 |

FOREIGN PATENT DOCUMENTS

| JP | 2003-215342 A | 7/2003 |
| JP | 2012-198351 A | 10/2012 |
| JP | 2013-54071 A | 3/2013 |

* cited by examiner

*Primary Examiner* — Jia X Pan

(74) *Attorney, Agent, or Firm* — Maier & Maier, PLLC

(57) ABSTRACT

According to one embodiment, a liquid crystal element includes a first transparent substrate, a second transparent substrate, and a first liquid crystal layer cured. The first liquid crystal layer contains first cholesteric liquid crystal and has a reflective surface which reflects first circularly polarized light having a first wavelength. A first helical axis of the first cholesteric liquid crystal is tilted in a uniform direction over an entire area of the first liquid crystal layer. Each of a first outer surface of the first transparent substrate and a second outer surface of the second transparent substrate forms an interface which totally reflects the first circularly polarized light reflected in the first liquid crystal layer.

12 Claims, 16 Drawing Sheets

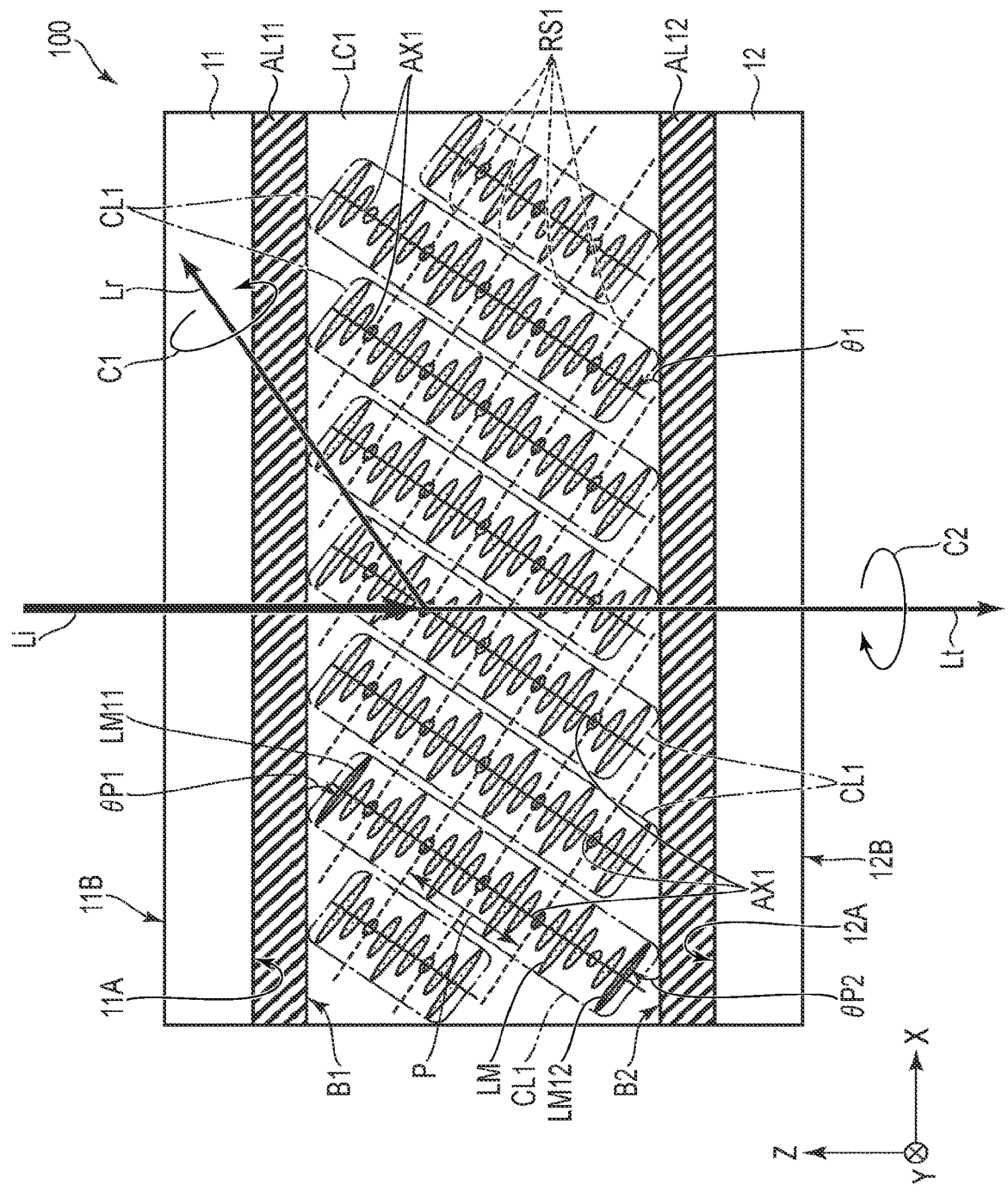
F I G. 1

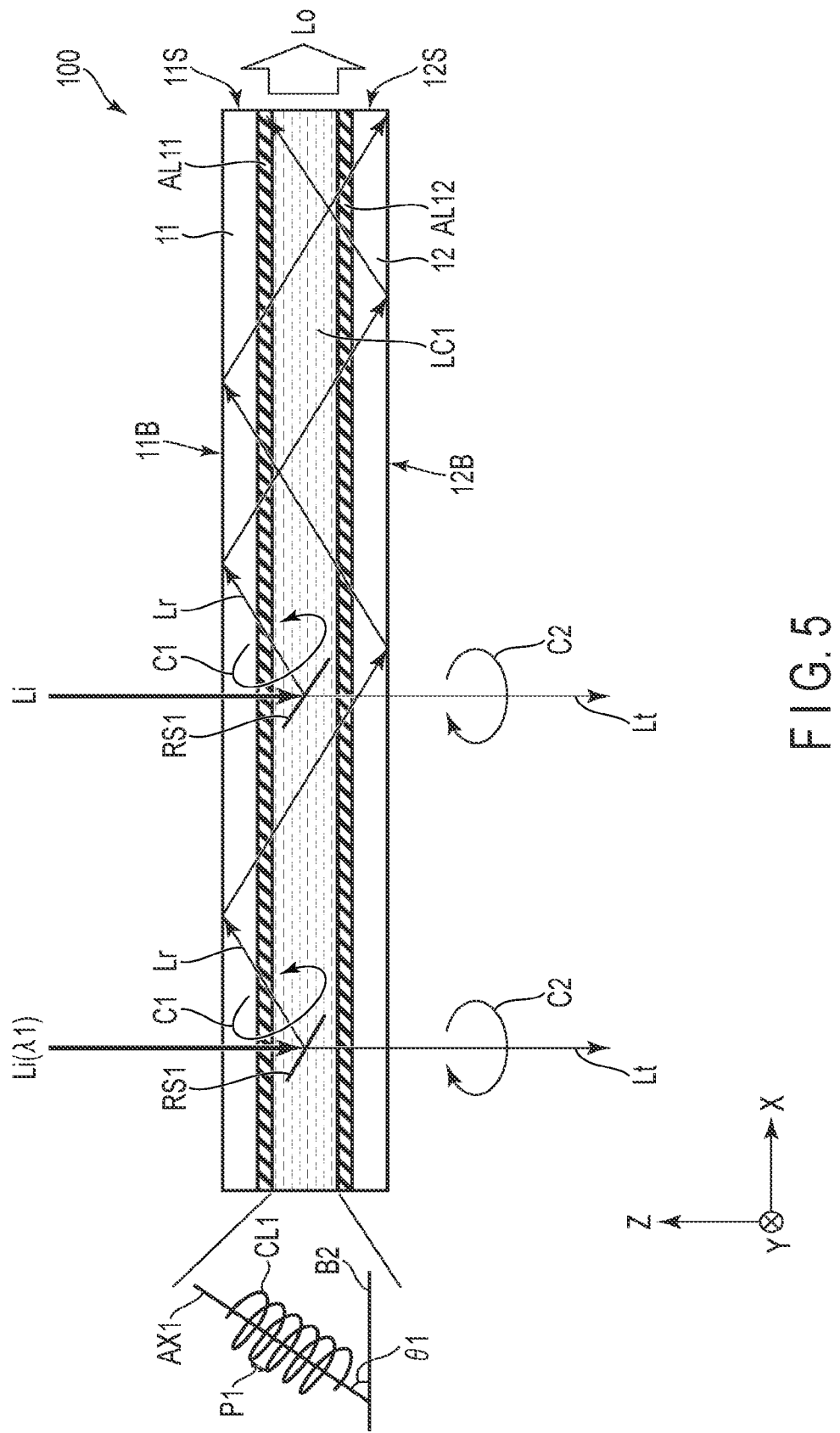
F I G. 5

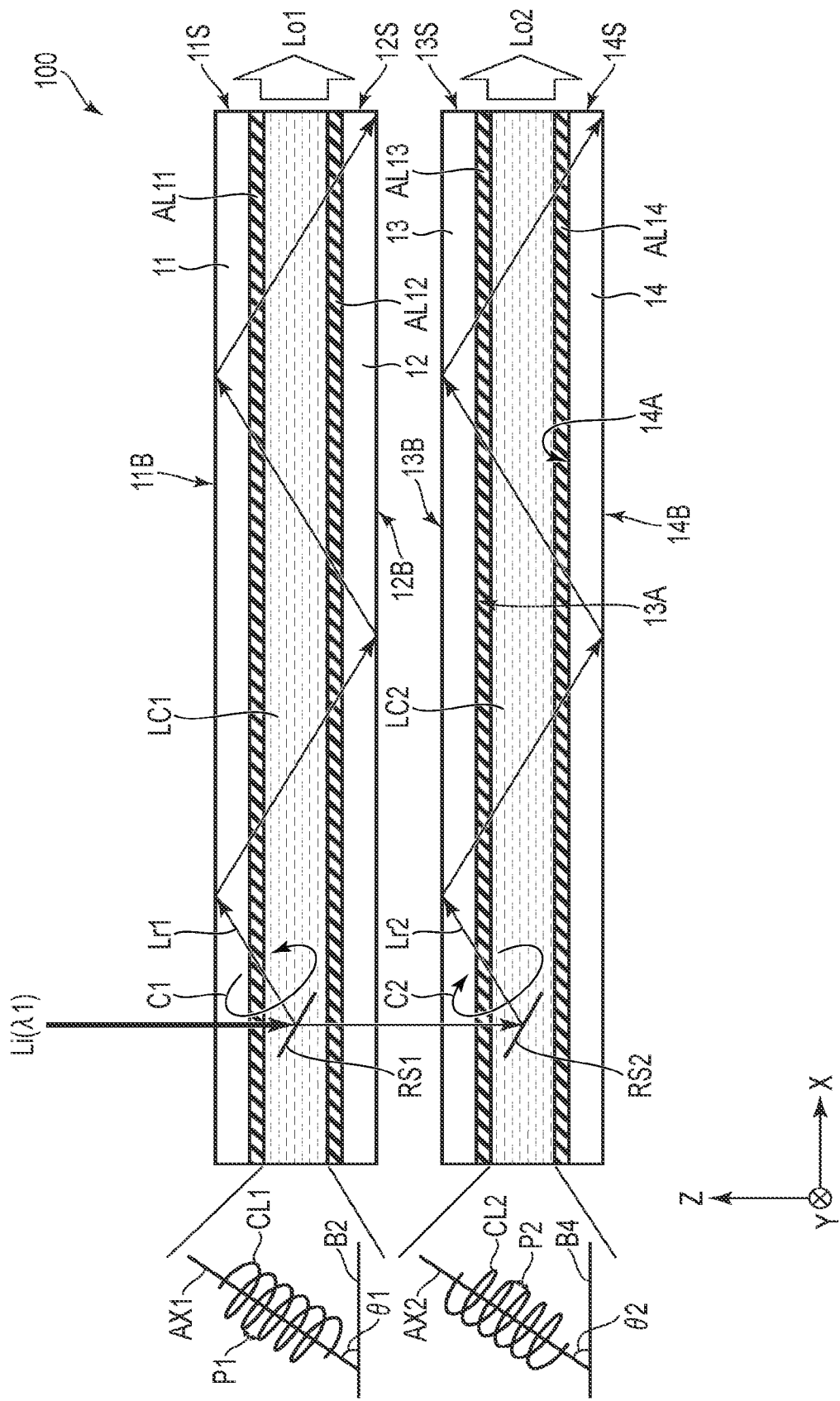
F I G. 6

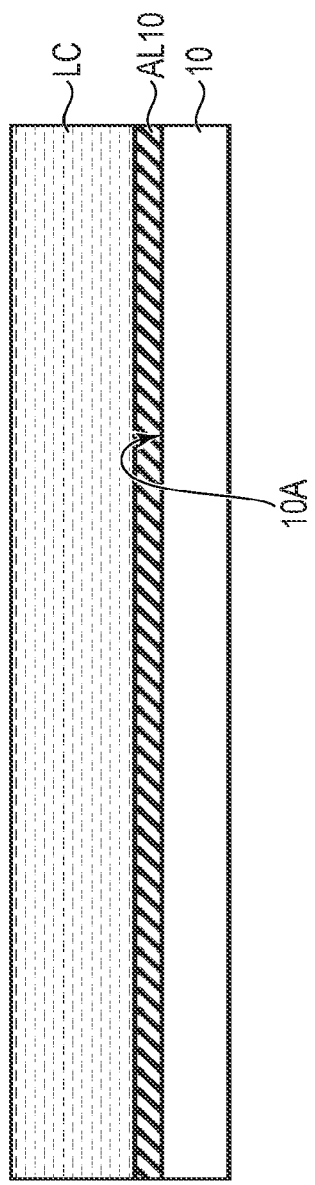
F I G. 9

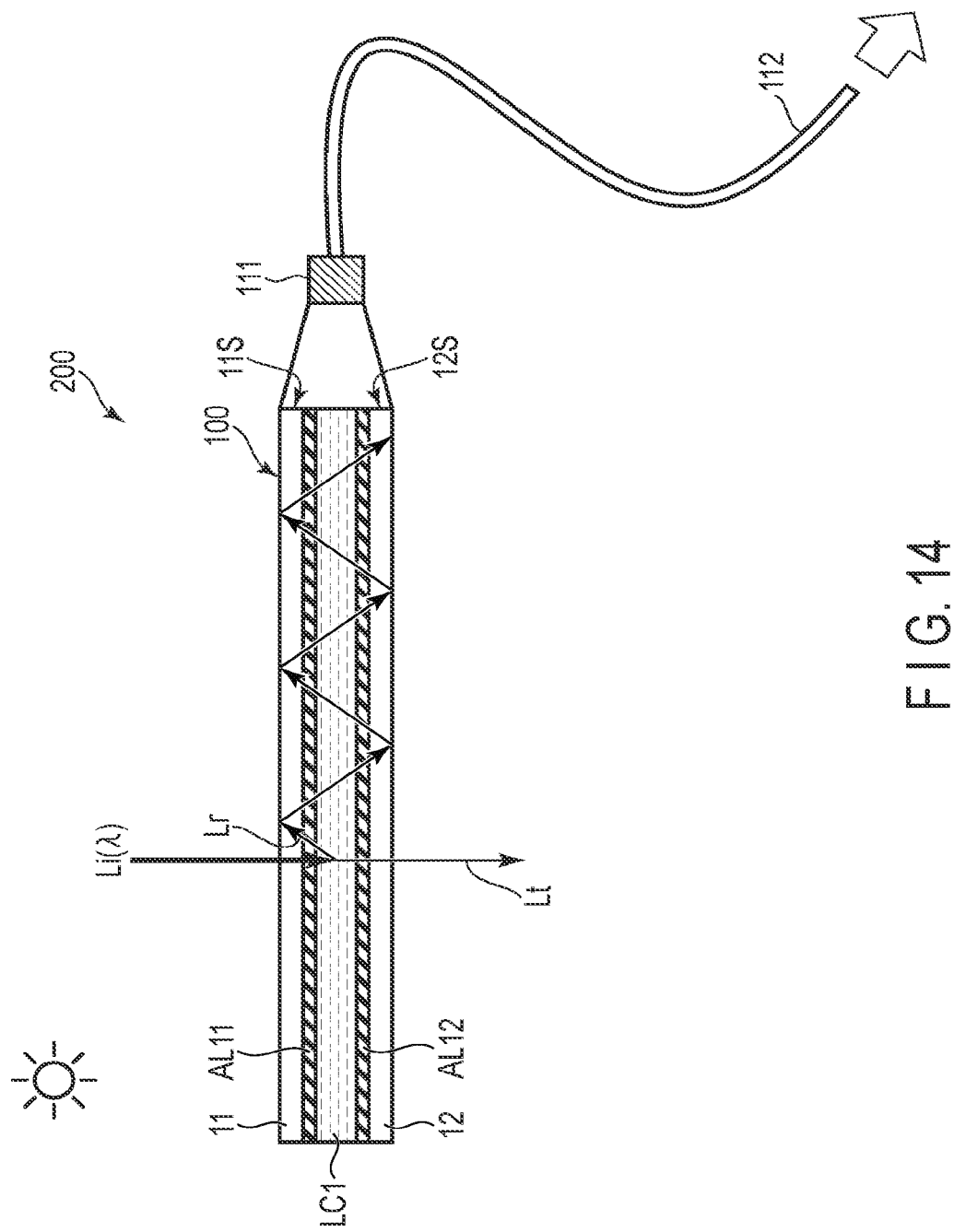
F I G. 14

LIQUID CRYSTAL ELEMENT

CROSS-REFERENCE TO RELATED APPLICATIONS

This application is based upon and claims the benefit of priority from Japanese Patent Application No. 2021-051981, filed Mar. 25, 2021, the entire contents of which are incorporated herein by reference.

FIELD

Embodiments described herein relate generally to a liquid crystal element.

BACKGROUND

In recent years, various types of liquid crystal elements using cholesteric liquid crystal have been considered. The cholesteric liquid crystal has a property of reflecting light of a specific wavelength depending on a helical pitch. For example, a reflector plate having an area where the helical axis of the cholesteric liquid crystal is perpendicular to a substrate surface, an area where the helical axis is parallel to the substrate surface, and an area where the helical axis is inclined to the substrate surface, has been proposed. In addition, in the other example, a display device selectively reflecting light of a specific wavelength by controlling a voltage applied to a liquid crystal layer has been proposed.

BRIEF DESCRIPTION OF THE DRAWINGS

FIG. 1 is a cross-sectional view showing an example of a liquid crystal element 100 of the embodiments.

FIG. 5 is a cross-sectional view showing an example of a liquid crystal element 100 of the embodiments.

FIG. 6 is a cross-sectional view showing another example of the liquid crystal element 100 of the embodiments.

FIG. 9 is a cross-sectional view showing a basic configuration.

FIG. 14 is a cross-sectional view showing an example of an optical system 200 comprising the liquid crystal element 100.

DETAILED DESCRIPTION

Figure 2:
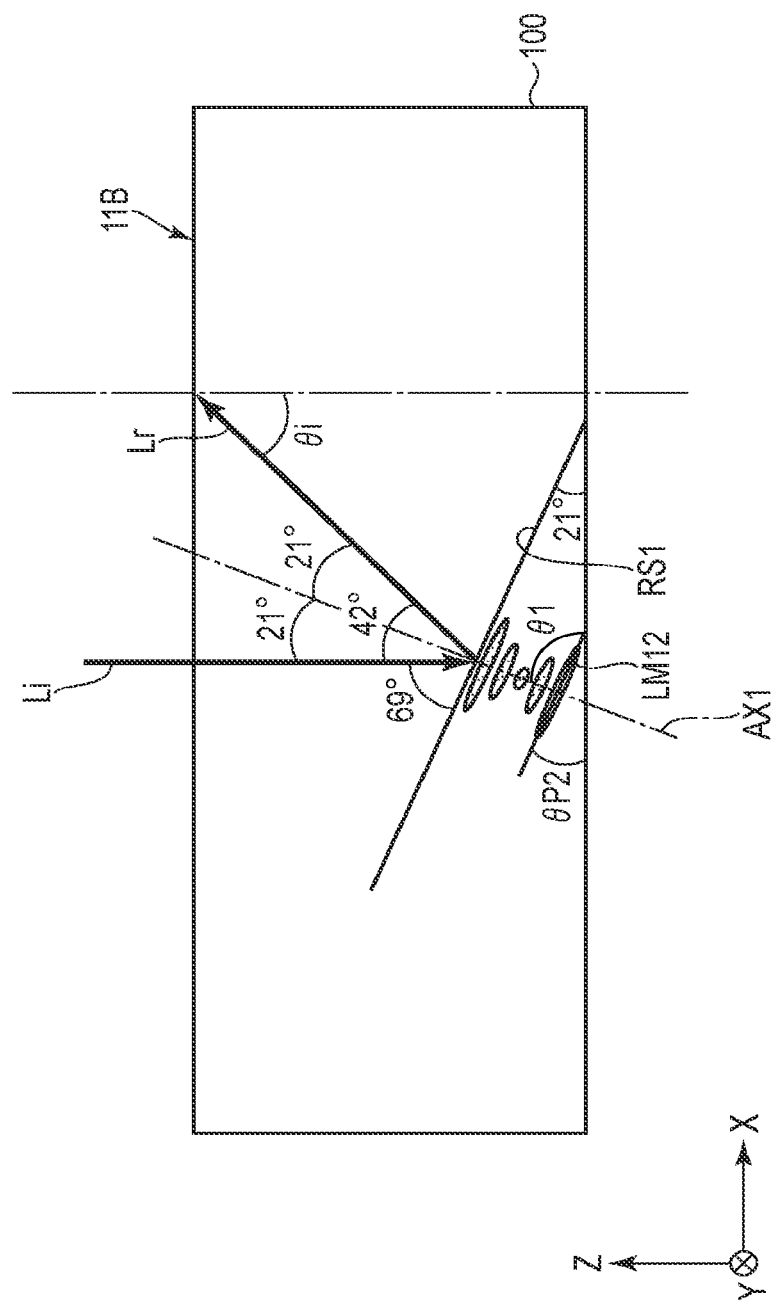
FIG. 2 is a view illustrating the tilt angle θ1 of the first helical axis AX1.

In general, according to one embodiment, a liquid crystal element includes: a first transparent substrate having a first inner surface and a first outer surface; a first alignment film disposed on the first inner surface; a second transparent substrate opposed to the first transparent substrate and having a second inner surface and a second outer surface; a second alignment film disposed on the second inner surface; and a first liquid crystal layer located between the first alignment film and the second alignment film, and cured in a state in which alignment directions of a plurality of liquid crystal molecules are fixed. The first liquid crystal layer contains first cholesteric liquid crystal and has a reflective surface which reflects first circularly polarized light having a first wavelength, of incident light transmitted through the first outer surface. A first helical axis of the first cholesteric liquid crystal is tilted in a uniform direction over an entire area of the first liquid crystal layer. Each of the first outer surface and the second outer surface forms an interface which totally reflects the first circularly polarized light reflected in the first liquid crystal layer.

According to another embodiment, a liquid crystal element includes a first transparent substrate having a first inner surface and a first outer surface; a second transparent substrate having a second inner surface and a second outer surface; a first liquid crystal layer located between the first transparent substrate and the second transparent substrate, and cured in a state in which alignment directions of a plurality of liquid crystal molecules are fixed; and a second liquid crystal layer located between the first liquid crystal layer and the second transparent substrate, and cured in a state in which alignment directions of a plurality of liquid crystal molecules are fixed. The first liquid crystal layer contains first cholesteric liquid crystal and has a reflective surface which reflects first circularly polarized light having a first wavelength, of incident light transmitted through the first outer surface. A first helical axis of the first cholesteric liquid crystal is tilted in a uniform direction over an entire area of the first liquid crystal layer. The second liquid crystal layer contains second cholesteric liquid crystal and has a reflective surface which reflects second circularly polarized light different from the first circularly polarized light. A second helical axis of the second cholesteric liquid crystal is tilted in a uniform direction over an entire area of the second liquid crystal layer. Each of the first outer surface and the second outer surface forms an interface which totally reflects each of the first circularly polarized light reflected on the first liquid crystal layer and the second circularly polarized light reflected on the second liquid crystal layer.

According to the embodiments, a liquid crystal element extracting light of a specific wavelength can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane. Viewing the X-Y plane is referred to as planar view. The first direction X and the second direction Y correspond to, for example, directions parallel to a substrate included in the liquid crystal element 100, and the third direction Z corresponds to a thickness direction of the liquid crystal element 100.

FIG. 1 is a cross-sectional view showing an example of the liquid crystal element 100 of the embodiments.

The liquid crystal element 100 comprises a first transparent substrate 11, a first alignment film AL11, a first liquid crystal layer LC1, a second alignment film AL12, and a second transparent substrate 12. The first transparent substrate 11 is opposed to the second transparent substrate 12 in the third direction Z. The first liquid crystal layer LC1 is located between the first transparent substrate 11 and the second transparent substrate 12.

The first transparent substrate 11 and the second transparent substrate 12 are composed of, for example, transparent glass plates or transparent synthetic resin plates. The first transparent substrate 11 has a first inner surface 11A and a first outer surface 11B on a side opposite to the first inner surface 11A. The second transparent substrate 12 has a second inner surface 12A and a second outer surface 11B on a side opposite to the second inner surface 12A. The first inner surface 11A and the first outer surface 11B, and the second inner surface 12A and the second outer surface 12B are the surfaces parallel to the X-Y plane.

The first outer surface 11B is in contact with a low refractive index medium having a refractive index smaller than that of the first transparent substrate 11. Similarly, the second outer surface 12B is in contact with a low refractive index medium having a refractive index smaller than that of the second transparent substrate 12. The low refractive index medium is, for example, air. Each of the first outer surface 11B and the second outer surface 12B forms an interface that totally reflects reflected light Lr reflected by the first liquid crystal layer LC1, which will be described later.

The first alignment film AL11 is disposed on the first inner surface 11A. The second alignment film AL12 is disposed on the second inner surface 12A. The first alignment film AL11 is opposed to the second alignment film AL12 in the third direction Z. Each of the first alignment film AL11 and the second alignment film AL12 is, for example, formed of polyimide and is a horizontal alignment film which has an alignment restriction force along the X-Y plane. The alignment treatment orientation of the first alignment film AL11 and the alignment treatment orientation of the second alignment film AL12 are parallel and opposite to each other.

The first liquid crystal layer LC1 is located between the first alignment film AL11 and the second alignment film AL12, and is in contact with the first alignment film AL11 and the second alignment film AL12. The first liquid crystal layer LC1 contains first cholesteric liquid crystal CL1. In FIG. 1, one liquid crystal molecule LM of a plurality of liquid crystal molecules located in the same plane parallel to the X-Y plane is shown as the liquid crystal molecule LM that constitutes the first cholesteric liquid crystal CL1, for simple illustration, and the alignment direction of the liquid crystal molecule LM corresponds to an average alignment direction of the plurality of liquid crystal molecules located in the same plane.

The first cholesteric liquid crystal CL1 can be regarded as a structure in which a plurality of liquid crystal molecules LM are stacked in a spiral shape while rotating around one first helical axis AX1. The plurality of first cholesteric liquid crystals CL1 are arranged in the first direction X and also arranged in the second direction Y. One first cholesteric liquid crystal CL1 contains a liquid crystal molecule LM11 located at one end and a liquid crystal molecule LM12 located at the other end. The liquid crystal molecule LM11 is close to the first alignment film AL11, and the liquid crystal molecule LM12 is close to the second alignment film AL12.

The liquid crystal molecule LM11 is aligned in a predetermined direction by the alignment restriction force of the first alignment film AL11. The liquid crystal molecule LM11 is aligned to form an acute pre-tilt angle $\theta P1$ in a clockwise direction from a boundary B1 between the first liquid crystal layer LC1 and the first alignment film AL11.

The liquid crystal molecule LM12 is aligned in a predetermined direction by the alignment restriction force of the second alignment film AL12. The liquid crystal molecule LM12 is aligned to form an acute pre-tilt angle $\theta P2$ in a clockwise direction from a boundary B2 between the first liquid crystal layer LC1 and the second alignment film AL12.

The pre-tilt angle $\theta P1$ is equal to the pre-tilt angle $\theta P2$. In other words, the alignment direction of the liquid crystal molecule LM11 is substantially coincident with the alignment direction of the liquid crystal molecule LM12. For example, the pre-tilt angles $\theta P1$ and $\theta P2$ are 20 degrees or more and are desirably larger than 21 degrees as described later.

The first helical axis AX1 of the first cholesteric liquid crystal CL1 is tilted to the normal of the first liquid crystal layer LC1, i.e., the third direction Z. The first helical axis AX1 of each of the plurality of first cholesteric liquid crystals CL1 is tilted in a uniform direction over the entire area of the first liquid crystal layer LC1. In the example shown in FIG. 1, the first helical axis AX1 is tilted to form an acute tilt angle $\theta 1$ counterclockwise from the boundary B2, the second inner surface 12A or the X-Y plane. Alternatively, the first helical axis AX1 can be considered to be tilted to form the acute tilt angle $\theta 1$ counterclockwise from the boundary B1 or the first inner surface 11A. The tilt angle $\theta 1$ of the first helical axis AX1 is set to, for example, an angle smaller than 69 degrees.

The first cholesteric liquid crystal CL1 has a helical pitch P. The helical pitch P indicates one cycle of the helix (i.e., the thickness along the first helical axis AX1 required for the liquid crystal molecules LM to rotate at 360 degrees).

The first liquid crystal layer LC1 has a plurality of reflective surfaces RS1 as represented by dotted lines, between the first alignment film AL11 and the second alignment film AL12. The plurality of reflective surfaces RS1 are substantially parallel to each other. The reflective surfaces RS1 divide incident light Li transmitted through the first outer surface 11B into reflected light Lr and transmitted light Lt according to the Bragg's law. The reflective surfaces RS1 correspond to planes where alignment directions of the liquid crystal molecules LM are parallel to each other or planes (equiphase wave surfaces) where the spatial planes are equivalent to each other.

In the X-Z cross section shown in FIG. 1, the reflective surfaces RS1 are tilted to the boundaries B1 and B2, the first inner surface 11A, the second inner surface 12A, or the X-Y plane. The reflective surfaces RS1 are substantially orthogonal to the first helical axes AX1.

The first cholesteric liquid crystal CL1 reflects circularly polarized light of the same turning direction as the turning direction of the first cholesteric liquid crystal CL1, of the light of the specific wavelength A. For example, when the turning direction of the first cholesteric liquid crystal CL1 is right-handed, the first cholesteric liquid crystal CL1 reflects right-handed circularly polarized light, of the light of a specific wavelength A, and transmits left-handed circularly polarized light. Similarly, when the turning direction of the first cholesteric liquid crystal CL1 is left-handed, the first cholesteric liquid crystal CL1 reflects the left-handed circularly polarized light of the light of the specific wavelength λ, and transmits the right-handed circularly polarized light.

The reflected light Lr shown in FIG. 1 is first circularly polarized light C1, and the transmitted light Lt is second circularly polarized light C2 in a direction opposite to the first circularly polarized light C1. In other words, one of the first circularly polarized light C1 and the second circularly polarized light C2 is the left-handed circularly polarized light and the other is the right-handed circularly polarized light. Moreover, the first circularly polarized light C1 and the second circularly polarized light C2 are the light of the same wavelength.

In general, the selective reflection band Δλ of the first cholesteric liquid crystal CL1 for vertically incident light is represented by "no*P to ne*P" based on the helical pitch P of the first cholesteric liquid crystal CL1, the refractive index ne for extraordinary light, and the refractive index no for ordinary light. For this reason, to efficiently reflect the circularly polarized light of a specific wavelength λ on the reflective surface RS1, the helical pitch P, and the refractive indices ne and no are set such that the specific wavelength λ is included in the selective reflection wavelength band Δλ.

Such a first liquid crystal layer LC1 is cured in a state in which the alignment directions of the plurality of liquid crystal molecules LM including the liquid crystal molecule LM1/ and the liquid crystal molecule LM12 are fixed. In other words, the alignment directions of the liquid crystal molecules LM are not controlled depending on the electric field. For this reason, the liquid crystal element 100 does not comprise an electrode for controlling the alignment.

FIG. 2 is a view illustrating the tilt angle θ1 of the first helical axis AX1. For example, the tilt angle will be described in the assumption that the incident light Li to the liquid crystal element 100 is made incident perpendicularly to the first outer surface 11B, and the average refractive index of the entire liquid crystal element 100 is 1.5 when the refractive index of the air in contact with the first outer surface 11B is set to 1.

As described above, part of the circularly polarized light of the incident light Li is reflected on the reflective surface RS1. To allow the reflected light Lr to be totally reflected on the first outer surface 11B (or an interface between the air and the liquid crystal element 100), it is required that the incident angle θi of the reflected light Lr to the first outer surface 11B is an angle larger than or equal to the critical angle. In the case of the relationship in refractive index described above, the critical angle is approximately 42 degrees. When the incident angle θi is 42 degrees, the tilt of the reflective surface RS1 to the X-Y plane is 21 degrees and the tilt angle θ1 of the first helical axis AX1 to the X-Y plane is 69 degrees.

In other words, to allow the reflected light Lr to be totally reflected on the first outer surface 11B and propagate inside the liquid crystal element 100, the incident angle θi is set to be larger than the critical angle, the tilt of the reflective surface RS1 is set to be larger than 21 degrees, and the tilt angle θ1 of the first helical axis AX1 is set to be smaller than 69 degrees. One of methods of implementing the tilt angle θ1 is a method of setting the pre-tilt angle θP1 of liquid crystal molecule LM11 and the pre-tilt angle θP2 of the liquid crystal molecule LM12 to be larger than 21 degrees.

Figure 3:
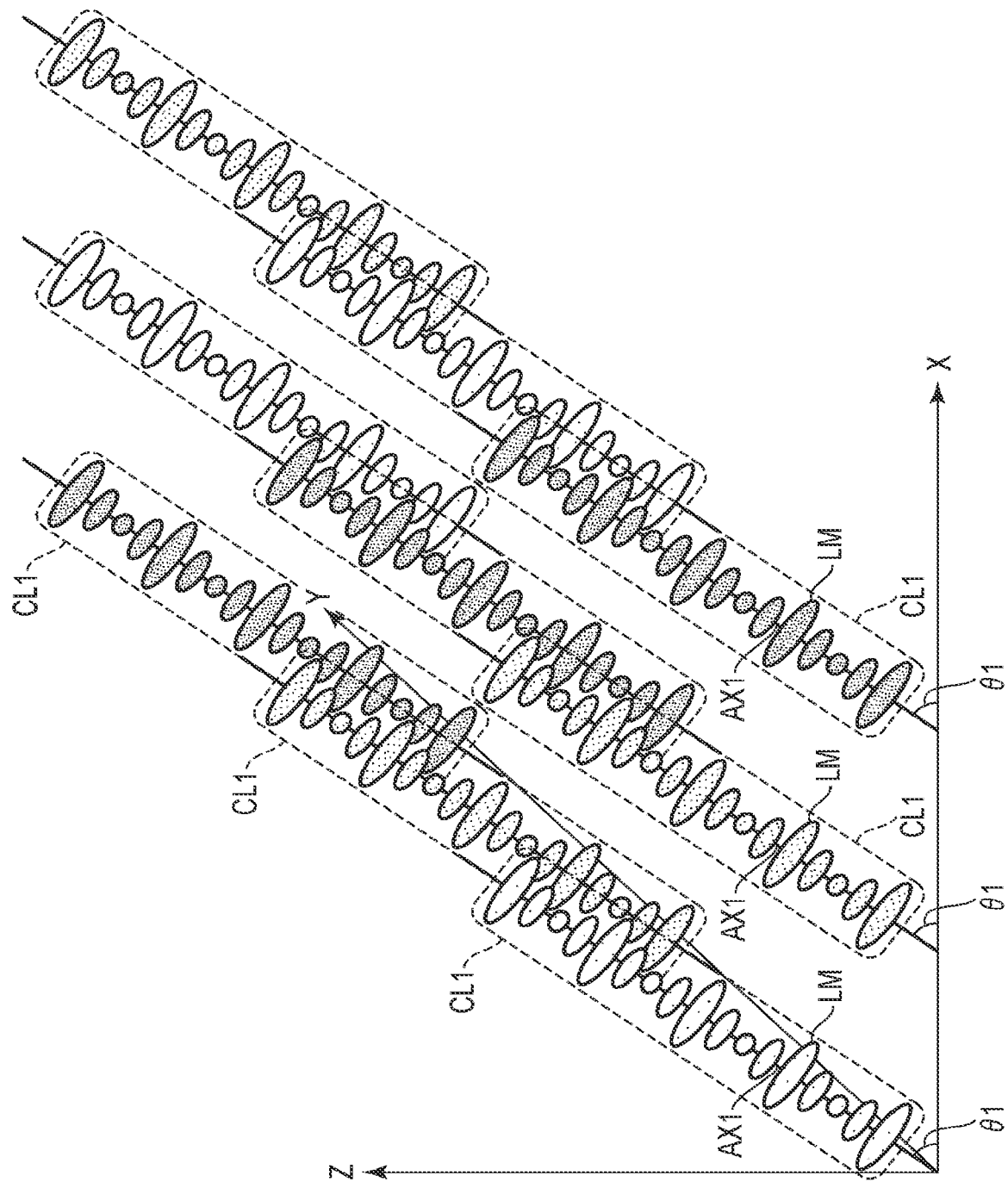
FIG. 3 is a view schematically showing a three-dimensional layout of the first cholesteric liquid crystal CL1.

FIG. 3 is a view schematically showing a three-dimensional layout of the first cholesteric liquid crystal CL1. The plurality of first cholesteric liquid crystals CL1 are arranged along the first direction X and also arranged along the second direction Y. For convenience of illustration, the hatching of some of the liquid crystal molecules LM is different, but all the liquid crystal molecules LM are of the same type. The first helical axis AX1 of each of the first cholesteric liquid crystals CL1 is tilted to the X-axis at the same tilt angle θ1 in the X-Z plane.

Figure 4:
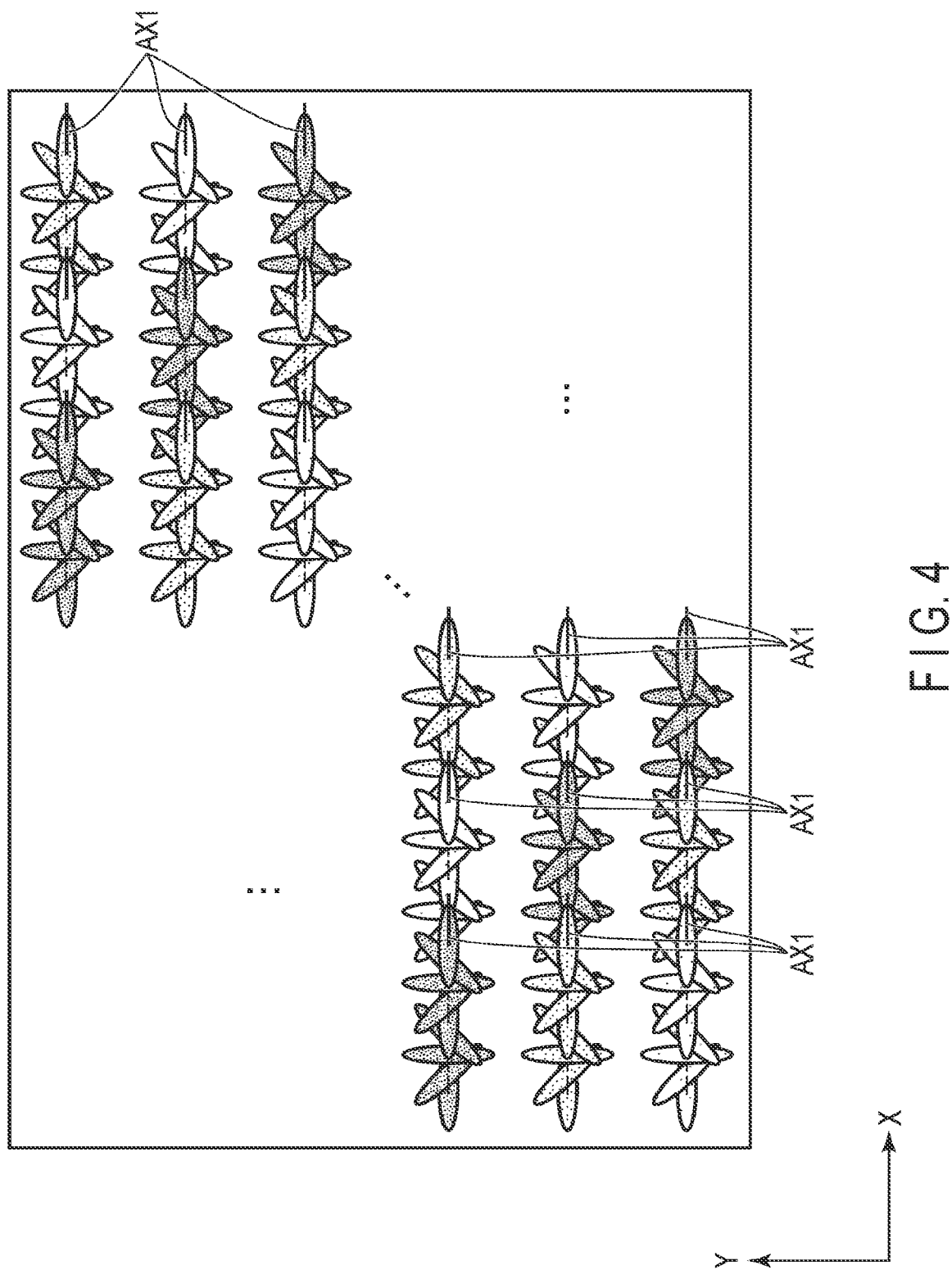
FIG. 4 is a view schematically showing a two-dimensional layout of the first cholesteric liquid crystal CL1.

FIG. 4 is a view schematically showing a two-dimensional layout of the first cholesteric liquid crystal CL1. When the X-Y plane is viewed, the first helical axis AX1 is oriented in a uniform direction. In the example shown in FIG. 4, the first helical axis AX1 of each of the first cholesteric liquid crystals CL1 is substantially parallel to the X-axis in the X-Y plane.

FIG. 5 is a cross-sectional view showing an example of the liquid crystal element 100 of the embodiments.

The first liquid crystal layer LC1 includes the first cholesteric liquid crystal CL1 that turns one direction. The first cholesteric liquid crystal CL1 is illustrated schematically. For example, the first cholesteric liquid crystal CL1 has a helical pitch P1 along the first helical axis AX1 to reflect the first circularly polarized light C1 of a specific first wavelength λ1. In the first cholesteric liquid crystal CL1, the helical pitch P1 is constant with substantially no change along the first helical axis AX1.

In the liquid crystal element 100, the first circularly polarized light C1 of the incident light Li having the first wavelength λ1 that is transmitted through the first outer surface 11B is reflected on the reflective surface RS1 formed on the first liquid crystal layer LC1. The reflected light Lr is reflected on the first outer surface 11B and then reflected on the second outer surface 12B, and propagates inside the liquid crystal element 100. The light propagating through the liquid crystal element 100 is transmitted through the side surface 11S of the first transparent substrate 11 and the side surface 12S of the second transparent substrate 12, and is extracted outside the liquid crystal element 100 as the output light Lo.

In addition, the second circularly polarized light C2 of the incident light Li having the first wavelength λ1 is transmitted through the liquid crystal element 100. The transmitted light Lt of the liquid crystal element 100 includes light of a wavelength different from the first wavelength λ1 besides the second circularly polarized light C2 of the first wavelength λ1.

Thus, according to the liquid crystal element 100 of the embodiments, a predetermined circularly polarized light of the incident light Li having the specific first wavelength λ1 can be trapped inside the liquid crystal element 100, made to propagate in one direction, and extracted from the side surface of the liquid crystal element 100. The first wavelength λ1 in this example may be visible light of any of the blue, green, and red wavelengths, infrared light, and ultraviolet light.

Modified Example 1

FIG. 6 is a cross-sectional view showing the other example of the liquid crystal element 100 of the embodiments.

The example shown in FIG. 6 is different from the example shown in FIG. 5 in that the liquid crystal element 100 further comprises a third transparent substrate 13, a third alignment film AL13, a second liquid crystal layer LC2, a fourth alignment film AL14, and a fourth transparent substrate 14. The third transparent substrate 13 and the fourth transparent substrate 14 are formed of the same material as the above first transparent substrate 11 and the like. The third alignment film AL13 and the fourth alignment film AL14 are formed of the same material as the above first alignment film AL11 and the like. The second liquid crystal layer LC2 is formed of the same material as the above first liquid crystal layer LC1.

The third transparent substrate 13 is opposed to the second transparent substrate 12 and separated from the second transparent substrate 12 in the third direction Z. The second liquid crystal layer LC2 is located between the third transparent substrate 13 and the fourth transparent substrate 14.

The third transparent substrate 13 has a third inner surface 13A and a third outer surface 13B. The fourth transparent substrate 14 has a fourth inner surface 14A and a fourth outer surface 14B. The third outer surface 13B and the fourth outer surface 14B are in contact with a low refractive index medium, for example, air. Each of the third outer surface 13B and the fourth outer surface 14B forms an interface which totally reflects the reflected light Lr2 reflected by the second liquid crystal layer LC2, which will be described later.

The third alignment film AL13 is disposed on the third inner surface 13A. The fourth alignment film AL14 is disposed on the fourth inner surface 14A. Each of the third alignment film AL13 and the fourth alignment film AL14 is, for example, a horizontal alignment film having an alignment restriction force along the X-Y plane.

The second liquid crystal layer LC2 is located between the third alignment film AL13 and the fourth alignment film AL14 and is in contact with the third alignment film AL13 and the fourth alignment film AL14. The second liquid crystal layer LC2 is cured in a state in which alignment directions of a plurality of liquid crystal molecules are fixed, similarly to the first liquid crystal layer LC1. In addition, the second liquid crystal layer LC2 includes a plurality of second cholesteric liquid crystals CL2, similarly to the first cholesteric liquid crystal CL1, but only one second cholesteric liquid crystal CL2 is simply illustrated in the figure.

The second helical axis AX2 of the second cholesteric liquid crystal CL2 is tilted to the normal of the second liquid crystal layer LC2, i.e., the third direction Z, similarly to the first cholesteric liquid crystal CL1. The second helical axis AX2 of each of the plurality of second cholesteric liquid crystals CL2 is tilted in a uniform direction over the entire area of the second liquid crystal layer LC2. A reflective surface RS2 is thereby formed in the second liquid crystal layer LC2.

For example, the tilt angle θ2 of the second helical axis AX2 to a boundary B4 between the second liquid crystal layer LC2 and the fourth alignment film AL14 or the X-Y plane is equal to the tilt angle θ1 of the first helical axis AX1 to the boundary B2 or the X-Y plane, and is smaller than 69 degrees.

The turning direction of the second cholesteric liquid crystal CL2 is opposite to that of the first cholesteric liquid crystal CL1. In addition, the helical pitch P2 of the second cholesteric liquid crystal CL2 is equal to the helical pitch P1 of the first cholesteric liquid crystal CL1.

Therefore, the reflective surface RS1 of the first liquid crystal layer LC1 is configured to reflect the first circularly polarized light C1, and the reflective surface RS2 of the second liquid crystal layer LC2 is configured to reflect the second circularly polarized light C2, which is opposite to the first circularly polarized light C1. However, the first circularly polarized light C1 and the second circularly polarized light C2 in this example are the light of the same first wavelength λ1.

In the liquid crystal element 100, the first circularly polarized light C1 of the incident light Li having the first wavelength λ1 that is transmitted through the first outer surface 11B, is reflected on the reflective surface RS1 of the first liquid crystal layer LC1. After being reflected on the first outer surface 11B, the reflected light Lr1 is also reflected on the second outer surface 12B. After that, the reflected light Lr1 is transmitted through the side surface 11S of the first transparent substrate 11 and the side surface 12S of the second transparent substrate 12, and extracted outside the liquid crystal element 100 as the output light Lot.

The second circularly polarized light C2 of the incident light Li having the first wavelength λ1 is transmitted through the first liquid crystal layer LC1 and the second transparent substrate 12, then transmitted through the third outer surface 13B, and reflected on the reflective surface RS2 of the second liquid crystal layer LC2. After being reflected on the third outer surface 13B, the reflected light Lr2 is also reflected on the fourth outer surface 14B. After that, the reflected light Lr2 is transmitted through the side surface 13S of the third transparent substrate 13 and the side surface 14S of the fourth transparent substrate 14, and is extracted outside the liquid crystal device 100 as the output light Lo2. A wavelength of the output light Lo2 is the same as the wavelength of the output light Lo1.

According to modified example 1, it is possible to divide the incident light Li having the first wavelength 21 into the first circularly polarized light C1 and the second circularly polarized light C2, confine the first circularly polarized light C1 and the second circularly polarized light C2 inside the liquid crystal element 100, allow the first circularly polarized light C1 and the second circularly polarized light C2 to propagate in one direction, and extract the first circularly polarized light C1 and the second circularly polarized light C2 from the side surface of the liquid crystal element 100. For this reason, the extraction efficiency of the light having the first wavelength λ1 can be improved as compared with the above example.

Modified Example 2

Figure 7:
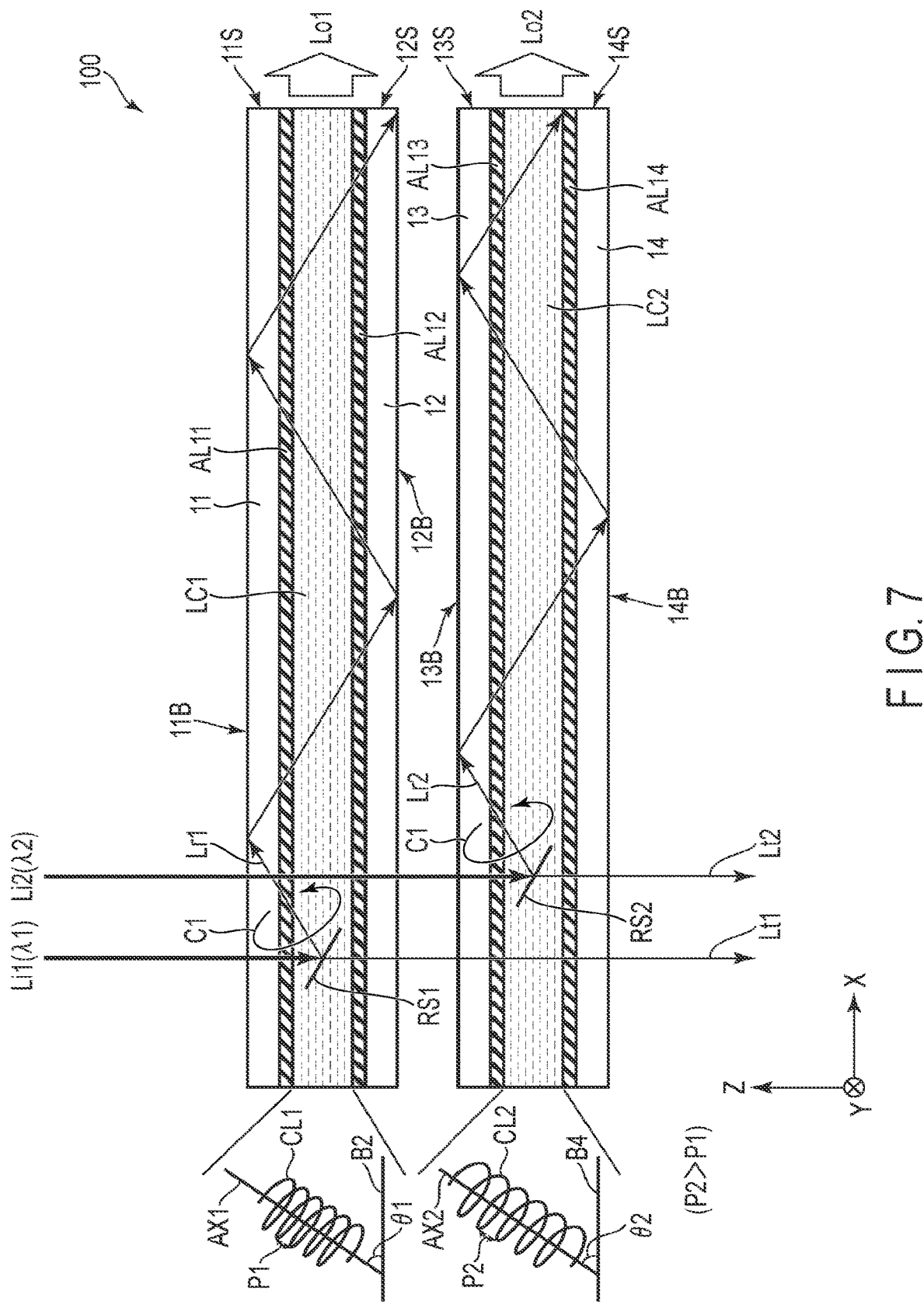
FIG. 7 is a cross-sectional view showing the other example of the liquid crystal element 100 of the embodiments.

FIG. 7 is a cross-sectional view showing the other example of the liquid crystal element 100 of the embodiments.

The example shown in FIG. 7 is different from the example shown in FIG. 6 in that the helical pitch P2 of the second cholesteric liquid crystal CL2 is different from the helical pitch P1 of the first cholesteric liquid crystal CL1.

The reflective surface RS1 of the first liquid crystal layer LC1 is configured to reflect the first circularly polarized light C1 of the first wavelength λ1. When the turning direction of the second cholesteric liquid crystal CL2 is the same as that of the first cholesteric liquid crystal CL1, the reflective surface RS2 of the second liquid crystal layer LC2 is configured to reflect the first circularly polarized light C1 of a second wavelength λ2 different from the first wavelength λ1.

For example, the helical pitch P2 is larger than the helical pitch P1. In this case, the second wavelength λ2 is longer than the first wavelength λ1. However, the helical pitch P2 may be smaller than the helical pitch P1 and, in this case, the second wavelength λ2 is shorter than the first wavelength λ1.

When the turning direction of the second cholesteric liquid crystal CL2 is opposite to that of the first cholesteric liquid crystal CL1, the reflective surface RS2 of the second liquid crystal layer LC2 is configured to reflect the second circularly polarized light C2 of the second wavelength λ2 different from the first wavelength λ1.

In the liquid crystal element 100, the first circularly polarized light C1 of the incident light Li having the first wavelength λ1 that is transmitted through the first outer surface 11B, is reflected on the reflective surface RS1 of the first liquid crystal layer LC1. After being reflected on the first outer surface 13B, the reflected light Lr1 is also totally reflected on the second outer surface 12B. After that, the reflected light Lr1 is transmitted through the side surface 11S of the first transparent substrate 11 and the side surface 12S of the second transparent substrate 12, and is extracted outside the liquid crystal element 100 as the output light Lo1.

In addition, the second circularly polarized light C2 of the first wavelength λ1 is also transmitted through the second liquid crystal layer LC2 after transmitted through the reflective surface RS1. Transmitted light Lt1 of the liquid crystal element 100 includes not only the second circularly polarized light C2 of the first wavelength λ1, but also light of the other wavelengths.

The first circularly polarized light C1 of incident light Li2 having the second wavelength λ2 that is transmitted through the first outer surface 11B is transmitted through the first liquid crystal layer LC1 and the first transparent substrate 11, then transmitted through the third outer surface 13B, and reflected on the reflective surface RS2 of the second liquid crystal layer LC2. After being reflected on the third outer surface 13B, the reflected light Lr2 is also reflected on the fourth outer surface 14B. After that, the reflected light Lr2 is transmitted through the side surface 13S of the third transparent substrate 13 and the side surface 14S of the fourth transparent substrate 14, and is extracted outside the liquid crystal device 100 as the output light Lo2.

In addition, the second circularly polarized light C2 of the second wavelength λ2 is transmitted through the reflective surface RS2. The transmitted light Lt2 of the liquid crystal element 100 includes not only the second circularly polarized light C2 of the second wavelength λ2, but also light of the other wavelengths.

According to modified example 2, it is possible to confine the circularly polarized light of part of the incident light Li having the first wavelength λ1 and the circularly polarized light of part of the incident light Li having the second wavelength λ2, inside the liquid crystal element 100, allow the circularly polarized light to propagate in one direction, and extract the circularly polarized light from the side surface of the liquid crystal element 100. For this reason, the multi-wavelength light can be extracted as compared with the above examples.

A liquid crystal layer containing cholesteric liquid crystal in a direction opposite to the first cholesteric liquid crystal CL1 may be added in addition to the first liquid crystal layer LC1, and a liquid crystal layer containing cholesteric liquid crystal in a direction opposite to the second cholesteric liquid crystal CL2 may be added in addition to the second liquid crystal layer LC2. The extraction efficiency of the incident light Li having the first wavelength λ1 and the incident light Li having the second wavelength λ2 can be thereby improved.

Modified Example 3

Figure 8:
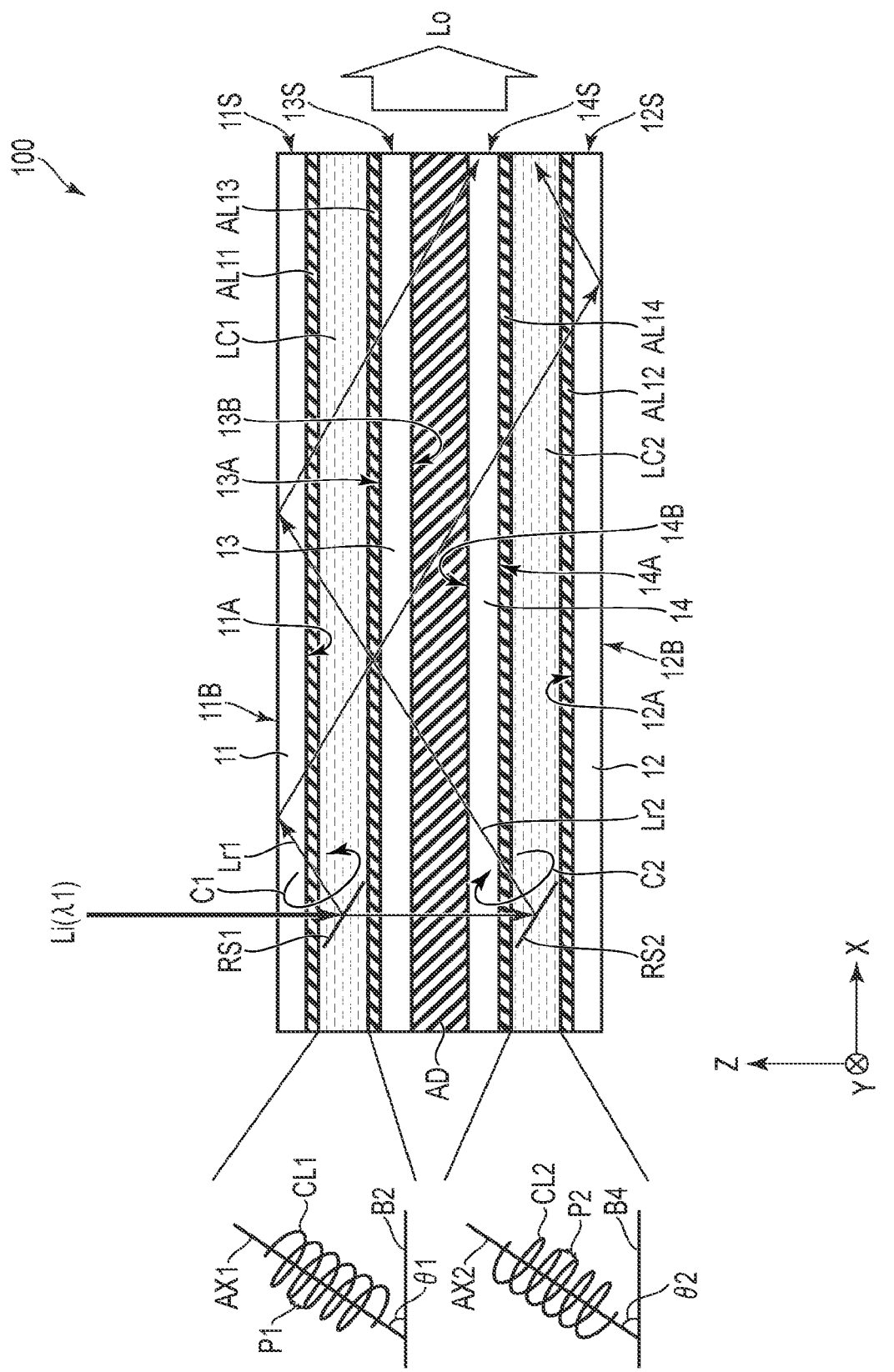
FIG. 8 is a cross-sectional view showing the other example of the liquid crystal element 100 of the embodiments.

FIG. 8 is a cross-sectional view showing the other example of the liquid crystal element 100 of the embodiments.

The liquid crystal element 100 comprises the first transparent substrate 11 having the first inner surface 11A and the first outer surface 11B, the second transparent substrate 12 having the second inner surface 12A and the second outer surface 12B, the first liquid crystal layer LC1 located between the first transparent substrate 11 and the second transparent substrate 12, and the second liquid crystal layer LC2 located between the first liquid crystal layer LC1 and the second transparent substrate 12. Then, each of the first outer surface 11B and the second outer surface 12B forms an interface that totally reflects each of the first circularly polarized light C1 reflected on the first liquid crystal layer LC1 and the second circularly polarized light C2 reflected on the second liquid crystal layer LC2.

In modified example 3, the liquid crystal element 100 further comprises the third transparent substrate 13 having the third inner surface 13A and the third outer surface 13B, the fourth transparent substrate 14 having the fourth inner surface 14A and the fourth outer surface 14B, an adhesive layer AD that is in contact with the third outer surface 13B and the fourth outer surface 14B, the first alignment film AL11 disposed on the first inner surface 11A, the second alignment film AL12 disposed on the second inner surface 12A, the third alignment film AL13 disposed on the third inner surface 13A, and the fourth alignment film AL14 disposed on the fourth inner surface 14A.

The third transparent substrate 13 is opposed to the first transparent substrate 11 in the third direction Z. The first liquid crystal layer LC1 is located between the first transparent substrate 11 and the third transparent substrate 13 and located between the first alignment film AL11 and the third alignment film AL13, and are in contact with the first alignment film AL11 and the third alignment film AL13. The first liquid crystal layer LC1 is cured in a state in which alignment directions of a plurality of liquid crystal molecules are fixed. In addition, the first liquid crystal layer LC1 includes a plurality of first cholesteric liquid crystals CL1, but only one first cholesteric liquid crystal CL1 is simply illustrated in the figure.

The first helical axis AX1 of the first cholesteric liquid crystal CL1 is tilted to the normal of the first liquid crystal layer LC1, i.e., the third direction Z. The first helical axis AX1 of each of the plurality of first cholesteric liquid crystals CL1 is tilted in a uniform direction over the entire area of the first liquid crystal layer LC1. The reflective surface RS1 configured to reflect the first circularly polarized light C1 is thereby formed in the first liquid crystal layer LC1.

The fourth transparent substrate 14 is opposed to the second transparent substrate 12 in the third direction Z. The second liquid crystal layer LC2 is located between the second transparent substrate 12 and the fourth transparent substrate 14 and located between the second alignment film AL12 and the fourth alignment film AL14, and are in contact with the second alignment film AL12 and the fourth alignment film AL14. The second liquid crystal layer LC2 is cured in a state in which alignment directions of a plurality of liquid crystal molecules are fixed. In addition, the second liquid crystal layer LC2 includes a plurality of second cholesteric liquid crystals CL2, but only one second cholesteric liquid crystal CL2 is simply illustrated in the figure.

The second helical axis AX2 of the second cholesteric liquid crystal LC2 is tilted to the normal of the second liquid crystal layer LC2, i.e., the third direction Z. The second helical axis AX2 of each of the plurality of second cholesteric liquid crystals CL2 is tilted in a uniform direction over the entire area of the second liquid crystal layer LC2. The reflective surface RS2 configured to reflect the second circularly polarized light C2 is thereby formed in the second liquid crystal layer LC2. The relationship between the first liquid crystal layer LC1 and the second liquid crystal layer LC2 is the same as that in modified example 1 as described with reference to FIG. 6.

An adhesive layer AD is transparent and adheres the third transparent substrate 13 to the fourth transparent substrate 14. A refractive index of the adhesive layer AD is equal to the refractive index of each of the third transparent substrate 13 and the fourth transparent substrate 14.

In the liquid crystal element 100, the first circularly polarized light C1 of the incident light Li having the first wavelength $\lambda 1$ that is transmitted through the first outer surface 11B, is reflected on the reflective surface RS1 of the first liquid crystal layer LC1. After being reflected on the first outer surface 11B, the reflected light Lr1 is transmitted through the first liquid crystal layer LC1 and the second liquid crystal layer LC2 and is also reflected on the second outer surface 12B. After that, the reflected light Lr1 is transmitted through the side surface 11S of the first transparent substrate 11, the side surface 12S of the second transparent substrate 12, the side surface 13S of the third transparent substrate 13, and the side surface 14S of the fourth transparent substrate 14, and is extracted outside the liquid crystal element 100 as the output light Lo.

The second circularly polarized light C2 of the incident light Li having the first wavelength $\lambda 1$ is transmitted through the first liquid crystal layer LC1 and the third transparent substrate 13, then transmitted through the fourth outer surface 14B, and reflected on the reflective surface RS2 of the second liquid crystal layer LC2. After being transmitted through the first liquid crystal layer LC1, the reflected light Lr2 is reflected on the first outer surface 11B. In addition, the reflected light Lr2 may be reflected on the first outer surface 11B and then reflected on the second outer surface 12B, which is not illustrated in the figure. After that, the reflected light Lr2 is transmitted through the side surface 11S of the first transparent substrate 11, the side surface 12S of the second transparent substrate 12, the side surface 13S of the third transparent substrate 13, and the side surface 14S of the fourth transparent substrate 14, and is extracted outside the liquid crystal element 100 as the output light Lo.

In other words, in the liquid crystal element 100, the first circularly polarized light C1 of the incident light Li having the first wavelength $\lambda 1$ is reflected on the first liquid crystal layer LC1 and the second circularly polarized light C2 is reflected on the second liquid crystal layer LC2 and, when output to the outside of the liquid crystal element 100, the first circularly polarized light C1 and the second circularly polarized light C2 are synthesized as the output light Lo.

According to the modified example 3, it is possible to divide the incident light Li having the first wavelength $\lambda 1$ into the first circularly polarized light C1 and the second circularly polarized light C2, confine the circularly polarized light inside the liquid crystal element 100, allow the circularly polarized light to propagate in one direction, and extract the circularly polarized light from the side surface of the liquid crystal element 100. For this reason, the extraction efficiency of the light having the first wavelength $\lambda 1$ can be improved.

In addition, light having the other wavelengths different from the first wavelength $\lambda 1$ is transmitted through the liquid crystal element 100. No interface in which media having remarkably different refractive indexes are in contact with each other exists inside the liquid crystal element 100, and the transmittance of the light having the other wavelengths can be improved.

The liquid crystal element 100 for extracting the light having the first wavelength $\lambda 1$ has been described, but a plurality of liquid crystal elements for extracting the light having the wavelengths other than the first wavelength $\lambda 1$ may be stacked.

Modified Example 4

The liquid crystal layer is located between a pair of transparent substrates or a pair of alignment films in each of the above-described examples, but is not limited thereto. For example, the liquid crystal layer containing the cholesteric liquid crystal can be formed on a substrate by applying a coating-type cholesteric liquid crystal.

FIG. 9 is a cross-sectional view showing a basic configuration.

An alignment film AL10 which is a horizontal alignment film is disposed on the inner surface 10A of the transparent substrate 10. The liquid crystal layer LC is formed by applying a liquid crystal material including a cholesteric liquid crystal monomer on the alignment film AL10, irradiating the liquid crystal material with ultraviolet light, and polymerizing a monomer.

The liquid crystal layer LC having the basic configuration described herein can be applied to not only the modified example 4, but also the other modified examples.

Figure 10:
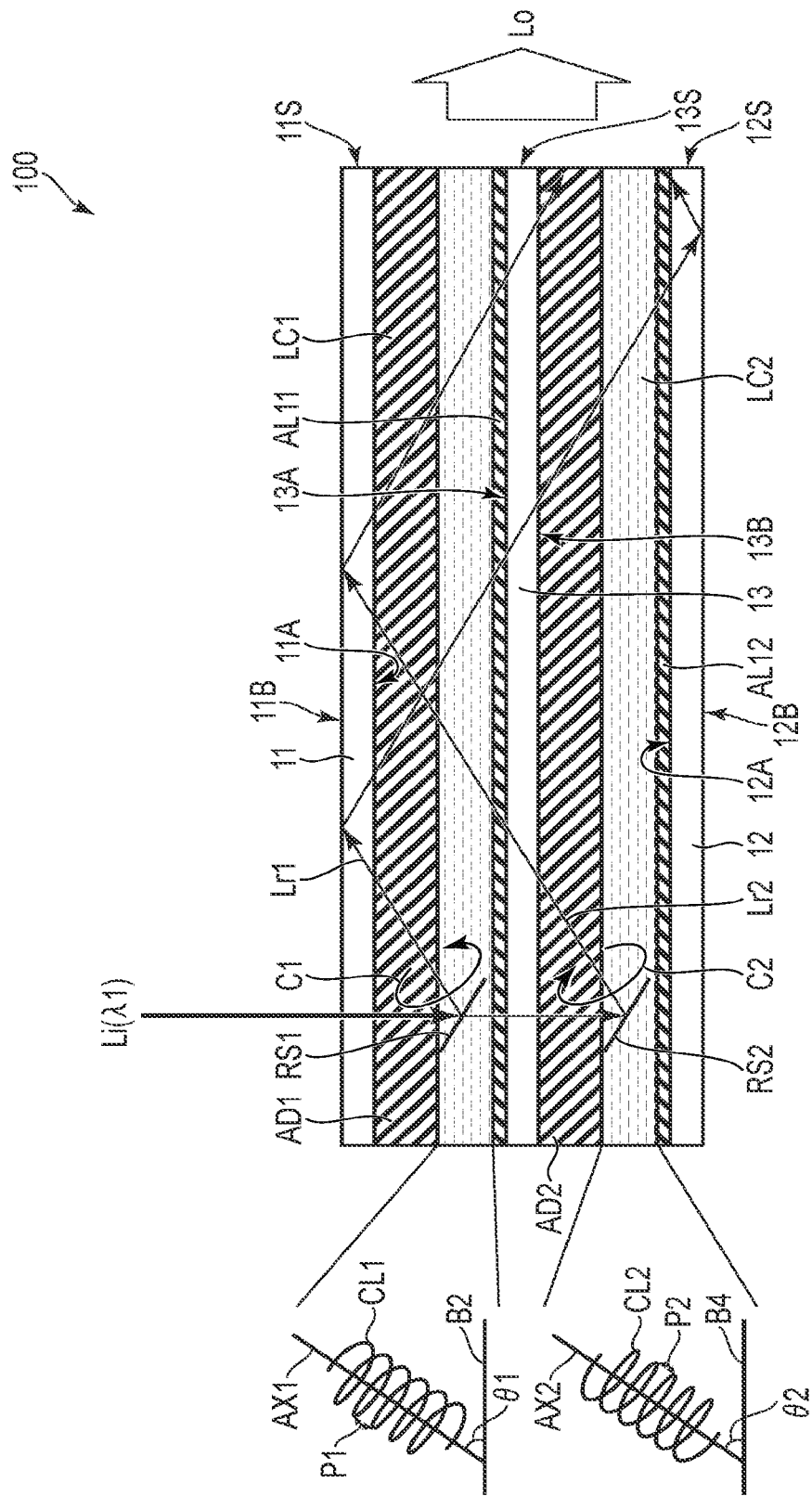
FIG. 10 is a cross-sectional view showing the other example of the liquid crystal element 100 of the embodiments.

FIG. 10 is a cross-sectional view showing the other example of the liquid crystal element 100 of the embodiments.

The example shown in FIG. 10 is different from the example shown in FIG. 8 in that one of surfaces of each of the first liquid crystal layer LC1 and the second liquid crystal layer LC2 is in contact with the alignment film.

The liquid crystal element 100 comprises the first transparent substrate 11 having the first inner surface 11A and the first outer surface 11B, the second transparent substrate 12 having the second inner surface 12A and the second outer surface 12B, the first liquid crystal layer LC1 located between the first transparent substrate 11 and the second transparent substrate 12, and the second liquid crystal layer LC2 located between the first liquid crystal layer LC1 and the second transparent substrate 12. Then, each of the first outer surface 11B and the second outer surface 12B forms an interface that totally reflects each of the first circularly polarized light C1 reflected on the first liquid crystal layer LC1 and the second circularly polarized light C2 reflected on the second liquid crystal layer LC2.

In the modified example 4, the liquid crystal element 100 further comprises the third transparent substrate 13 having the third inner surface 13A and the third outer surface 13B, a first adhesive layer AD1 that is in contact with the first inner surface 11A and the first liquid crystal layer LC1, a second adhesive layer AD2 that is in contact with the third outer surface 13B and the second liquid crystal layer LC2, the first alignment film AL11 disposed on the third inner surface 13A, and a second alignment film AL12 disposed on the second inner surface 12A. The third transparent substrate 13 is located between the first liquid crystal layer LC1 and the second liquid crystal layer LC2. The first alignment film AL11 is in contact with the first liquid crystal layer LC1, and the second alignment film AL12 is in contact with the second liquid crystal layer LC2.

The third transparent substrate 13, the first alignment film AL11, and the first liquid crystal layer LC1 correspond to the basic configuration shown in FIG. 9. Similarly, the second transparent substrate 12, the second alignment film AL12, and the second liquid crystal layer LC2 also correspond to the basic configuration shown in FIG. 9. Details of the first liquid crystal layer LC1 and the second liquid crystal layer LC2 are the same as those of the above-described examples.

The first adhesive layer AD1 is transparent and adheres the first transparent substrate 11 to the first liquid crystal layer LC1. A refractive index of the first adhesive layer AD1 is equal to the refractive index of the first transparent substrate 11.

The second adhesive layer AD2 is transparent and adheres the third transparent substrate 13 to the second liquid crystal layer LC2. A refractive index of the second adhesive layer AD2 is equal to the refractive index of the third transparent substrate 13.

The optical effects in the liquid crystal element 100 are the same as those of the above-described modified example 3.

The same advantages as those of the modified example 3 can also be obtained in the modified example 4. In addition, the number of components can be reduced and the manufacturing costs can be reduced as compared with the modified example 3.

In the modified example 4, too, not only the liquid crystal element 100 for extracting the light of the first wavelength $\lambda 1$, but also a plurality of liquid crystal elements for extracting the light of wavelengths different from the first wavelength $\lambda 1$ may be stacked.

Modified Example 5

Figure 11:
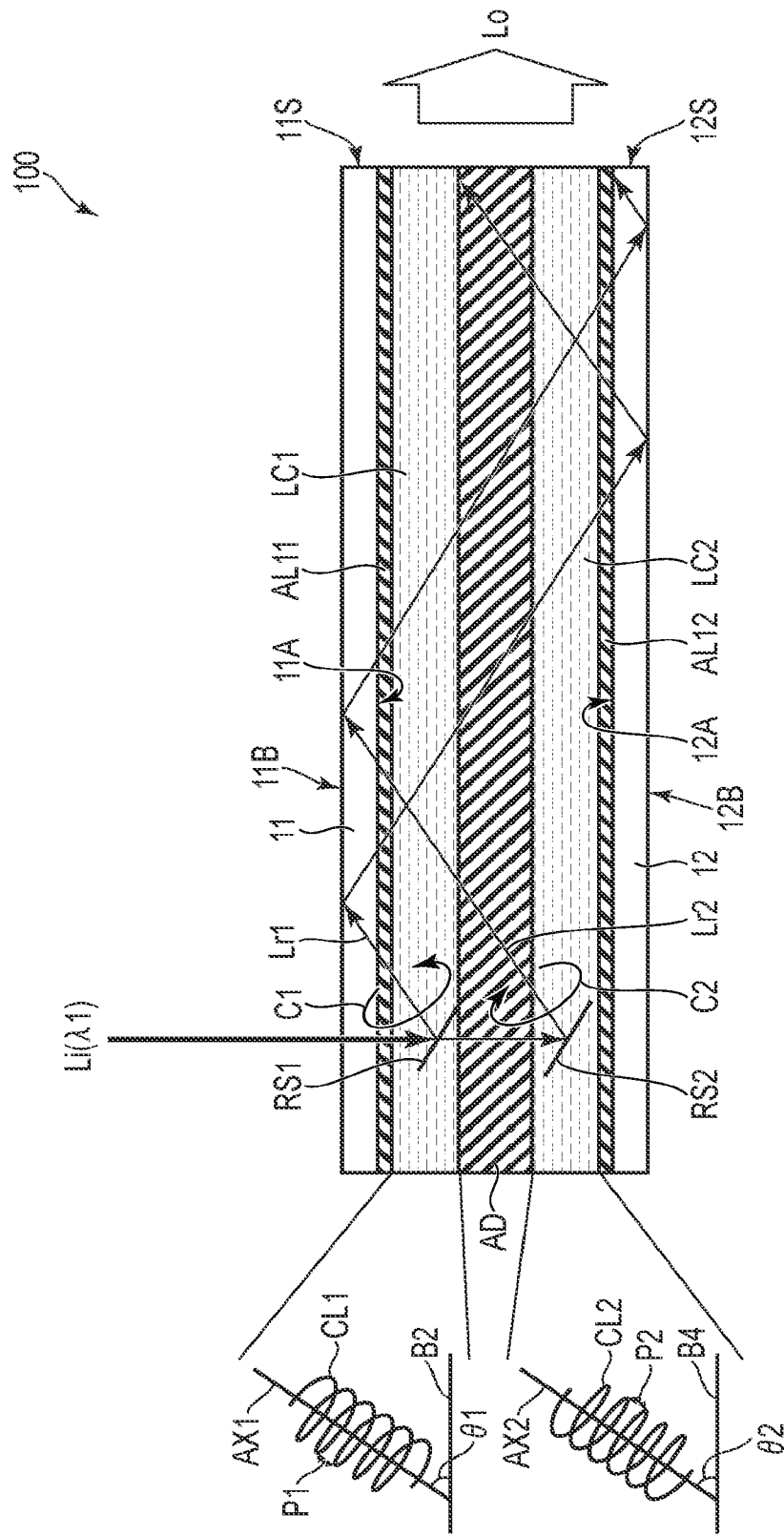
FIG. 11 is a cross-sectional view showing the other example of the liquid crystal element 100 of the embodiments.

FIG. 11 is a cross-sectional view showing the other example of the liquid crystal element 100 of the embodiments.

The example shown in FIG. 11 is different from the example shown in FIG. 10 in that the third transparent substrate 13 is omitted.

The liquid crystal element 100 comprises the first transparent substrate 11 having the first inner surface 11A and the first outer surface 11B, the second transparent substrate 12 having the second inner surface 12A and the second outer surface 12B, the first liquid crystal layer LC1 located between the first transparent substrate 11 and the second transparent substrate 12, and the second liquid crystal layer LC2 located between the first liquid crystal layer LC1 and the second transparent substrate 12. Then, each of the first outer surface 11B and the second outer surface 12B forms an interface that totally reflects each of the first circularly polarized light C1 reflected on the first liquid crystal layer LC1 and the second circularly polarized light C2 reflected on the second liquid crystal layer LC2.

In the modified example 5, the liquid crystal element 100 further comprises an adhesive layer AD that is in contact with the first liquid crystal layer LC1 and the second liquid crystal layer LC2, the first alignment film AL11 disposed on the first inner surface 11A, and the second alignment film AL12 disposed on the second inner surface 12A. The first alignment film AL11 is in contact with the first liquid crystal layer LC1, and the second alignment film AL12 is in contact with the second liquid crystal layer LC2.

The first transparent substrate 11, the first alignment film AL11, and the first liquid crystal layer LC1 correspond to the basic configuration shown in FIG. 9. Similarly, the second transparent substrate 12, the second alignment film AL12, and the second liquid crystal layer LC2 also correspond to the basic configuration shown in FIG. 9. Details of the first liquid crystal layer LC1 and the second liquid crystal layer LC2 are the same as those of the above-described examples.

The adhesive layer AD is transparent and adheres the first liquid crystal layer LC1 to the second liquid crystal layer LC2.

The optical effects in the liquid crystal element 100 are the same as those of the above-described modified example 3.

The same advantages as those of the modified example 3 can also be obtained in the modified example 5. In addition, the number of components can be reduced and the manufacturing costs can be reduced as compared with the modified example 4.

In the modified example 5, too, not only the liquid crystal element 100 for extracting the light of the first wavelength $\lambda 1$, but also a plurality of liquid crystal elements for extracting the light of wavelengths different from the first wavelength $\lambda 1$ may be stacked.

Modified Example 6

Figure 12:
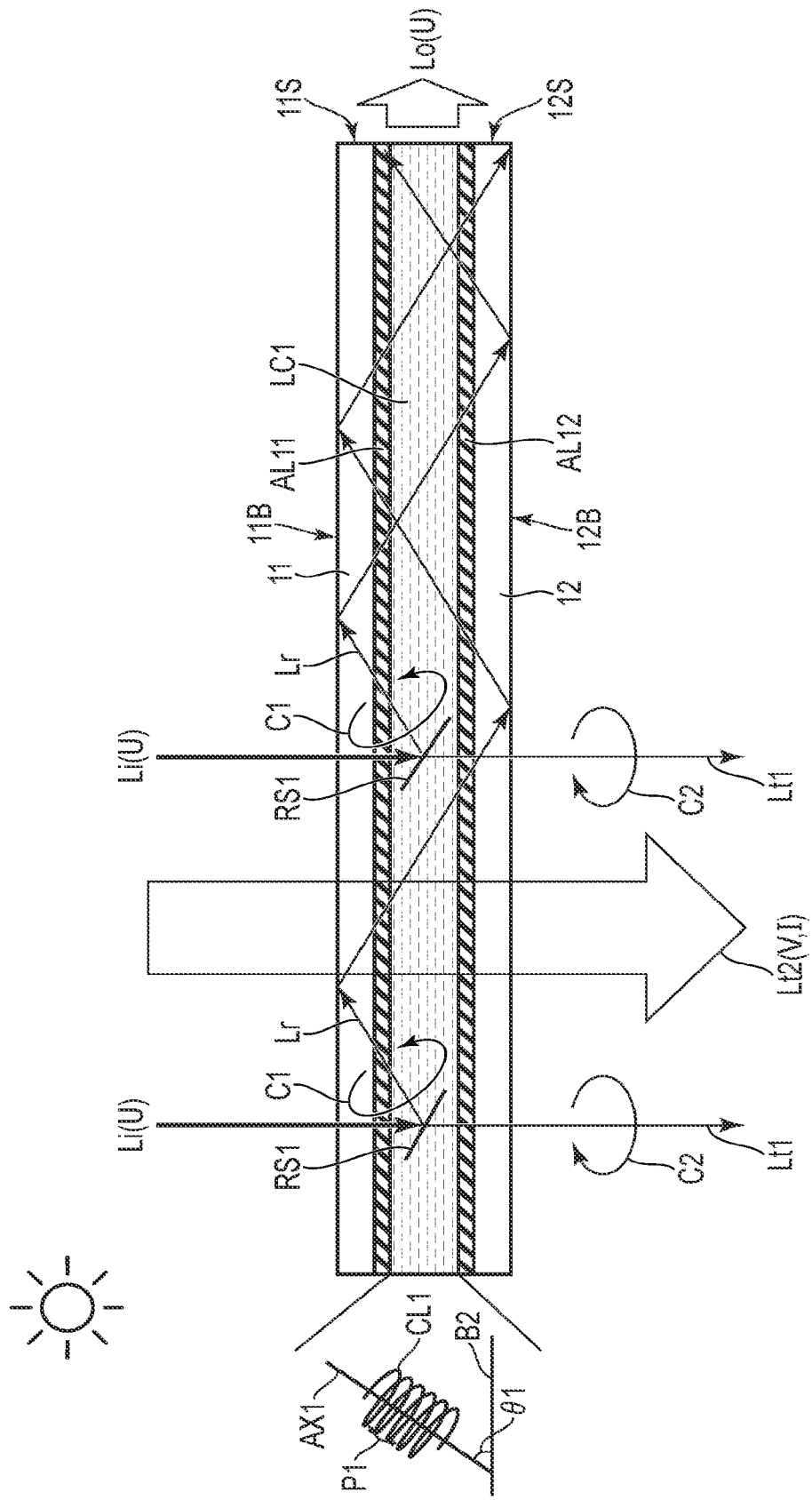
FIG. 12 is a cross-sectional view showing the other example of the liquid crystal element 100 of the embodiments.

FIG. 12 is a cross-sectional view showing the other example of the liquid crystal element 100 of the embodiments.

It is assumed here that the incident light to the liquid crystal element 100 is solar light. The solar light includes infrared light I and ultraviolet light U as well as visible light V. The reflective surface RS1 of the first liquid crystal layer LC1 is configured to reflect the first circularly polarized light C1 of the ultraviolet light U. In other words, the helical pitch P1 of the first cholesteric liquid crystal CL1 contained in the first liquid crystal layer LC1 is set depending on the wavelength of the ultraviolet light U.

In the liquid crystal element 100, the first circularly polarized light C1 of the incident light Li that is the ultraviolet light U transmitted through the first outer surface 11B, is reflected on the reflective surface RS1 formed on the first liquid crystal layer LC1. The reflected light Lr is reflected on the first outer surface 11B and then reflected on the second outer surface 12B, and propagates inside the liquid crystal element 100. The light propagating through the liquid crystal element 100 is transmitted through the side surface 11S of the first transparent substrate 11 and the side surface 12S of the second transparent substrate 12, and is extracted outside the liquid crystal element 100 as the output light Lo of the ultraviolet light U.

In addition, the second circularly polarized light C2 of the incident light Li of the ultraviolet light U is transmitted through the liquid crystal element 100 as the transmitted light Lt1. The transmitted light Lt2 of the liquid crystal element 100 includes the visible light V and the infrared light I.

According to the liquid crystal element 100, a predetermined circularly polarized light of the incident light Li of the ultraviolet light U can be confined inside the liquid crystal element 100, made to propagate in one direction, and extracted from the side surface of the liquid crystal element 100. In addition, the liquid crystal element 100 allows each of a first component (blue component), a second component (green component), and a third component (red component) that are main components of the visible light V to be transmitted as the transmitted light Lt2. For this reason, coloring the light transmitted through the liquid crystal element 100 can be suppressed.

The extraction efficiency of the ultraviolet light U can be improved by adding the liquid crystal layer containing the cholesteric liquid crystal in a direction opposite to the first cholesteric liquid crystal CL1 in addition to the first liquid crystal layer LC1, similarly to the above modified example 1.

Modified Example 7

Figure 13:
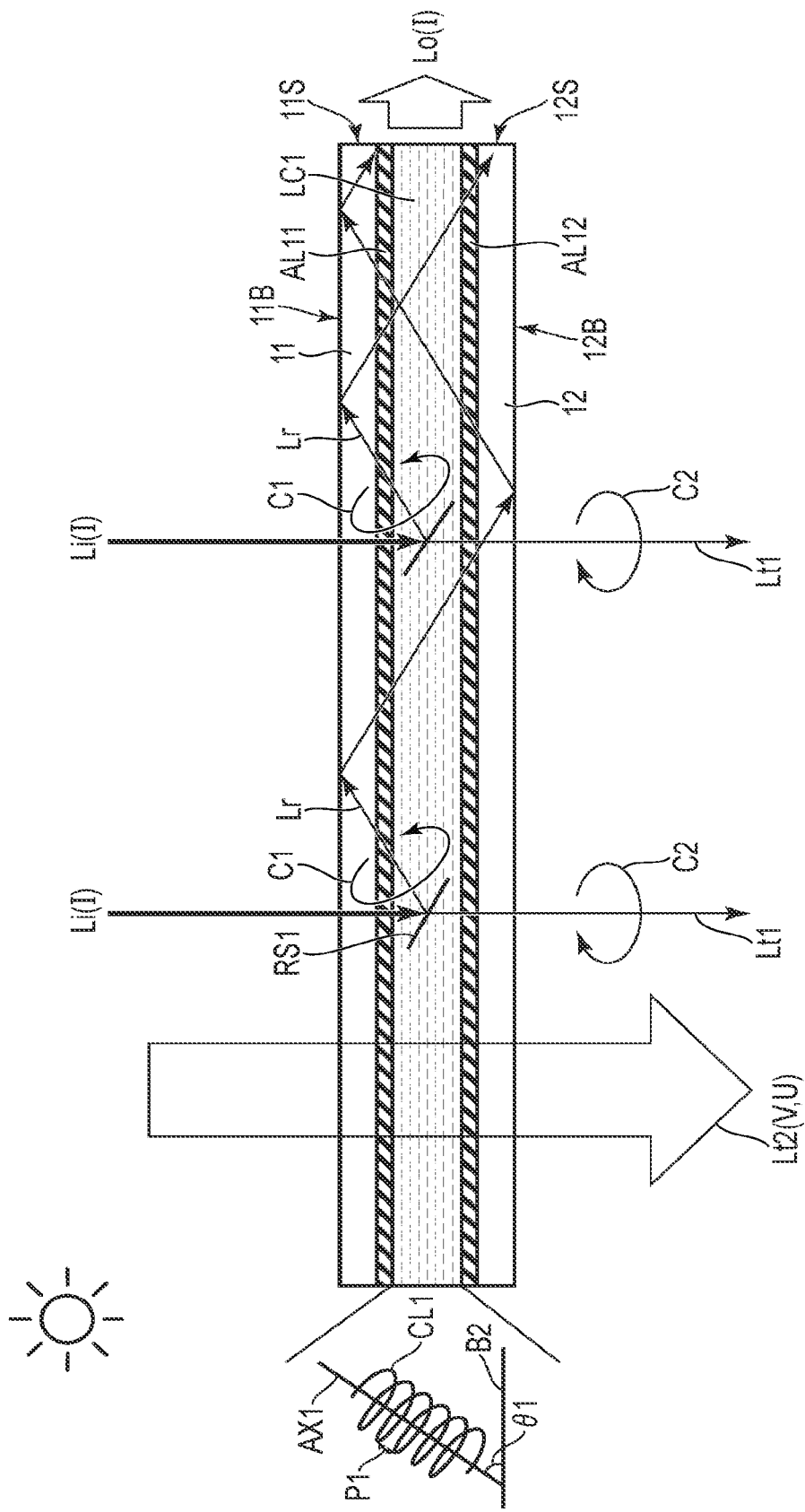
FIG. 13 is a cross-sectional view showing the other example of the liquid crystal element 100 of the embodiments.

FIG. 13 is a cross-sectional view showing the other example of the liquid crystal element 100 of the embodiments.

The example shown in FIG. 13 is different from the example shown in FIG. 12 in that the reflective surface RS1 of the first liquid crystal layer LC1 is configure to reflect the first circularly polarized light C1 of the infrared light I. In other words, the helical pitch P1 of the first cholesteric liquid crystal CL1 contained in the first liquid crystal layer LC1 is set depending on the wavelength of the infrared light I and is larger than the helical pitch P1 in the example shown in FIG. 12.

In the liquid crystal element 100, the first circularly polarized light C1 of the incident light Li that is the infrared light I transmitted through the first outer surface 11B, is reflected on the reflective surface RS1 formed on the first liquid crystal layer LC1. The reflected light Lr is reflected on the first outer surface 11B and then reflected on the second outer surface 12B, and propagates inside the liquid crystal element 100. The light propagating through the liquid crystal element 100 is transmitted through the side surface 11S of the first transparent substrate 11 and the side surface 12S of the second transparent substrate 12, and is extracted outside the liquid crystal element 100 as the output light Lo of the infrared light I.

In addition, the second circularly polarized light C2 of the incident light Li of the infrared light I is transmitted through the liquid crystal element 100 as the transmitted light Lt1. The transmitted light Lt2 of the liquid crystal element 100 includes the visible light V and the ultraviolet light U.

According to the liquid crystal element 100, a predetermined circularly polarized light of the incident light Li of the infrared light I can be confined inside the liquid crystal element 100, made to propagate in one direction, and extracted from the side surface of the liquid crystal element 100. In addition, since the liquid crystal element 100 allows the main components of the visible light V to be transmitted as the transmitted light Lt2, coloring the light transmitted through the liquid crystal element 100 can be suppressed.

The extraction efficiency of the infrared light I can be improved by adding the liquid crystal layer containing the cholesteric liquid crystal in a direction opposite to the first cholesteric liquid crystal CL1 in addition to the first liquid crystal layer LC1, similarly to the above modified example 1.

Applied Example 1

FIG. 14 is a cross-sectional view showing an example of an optical system 200 comprising the liquid crystal element 100.

The optical system 200 comprises the above-described liquid crystal element 100, a condenser 111, and an optical fiber 112. The liquid crystal element 100 described herein is an example and any liquid crystal elements 100 described in the above examples may be applied. The condenser 111 is connected to the side surfaces of the liquid crystal element 100, i.e., the side surface 11S of the first transparent substrate 11 and the side surface 12S of the second transparent substrate 12. The optical fiber 112 is connected to the condenser 111.

Figure 15:
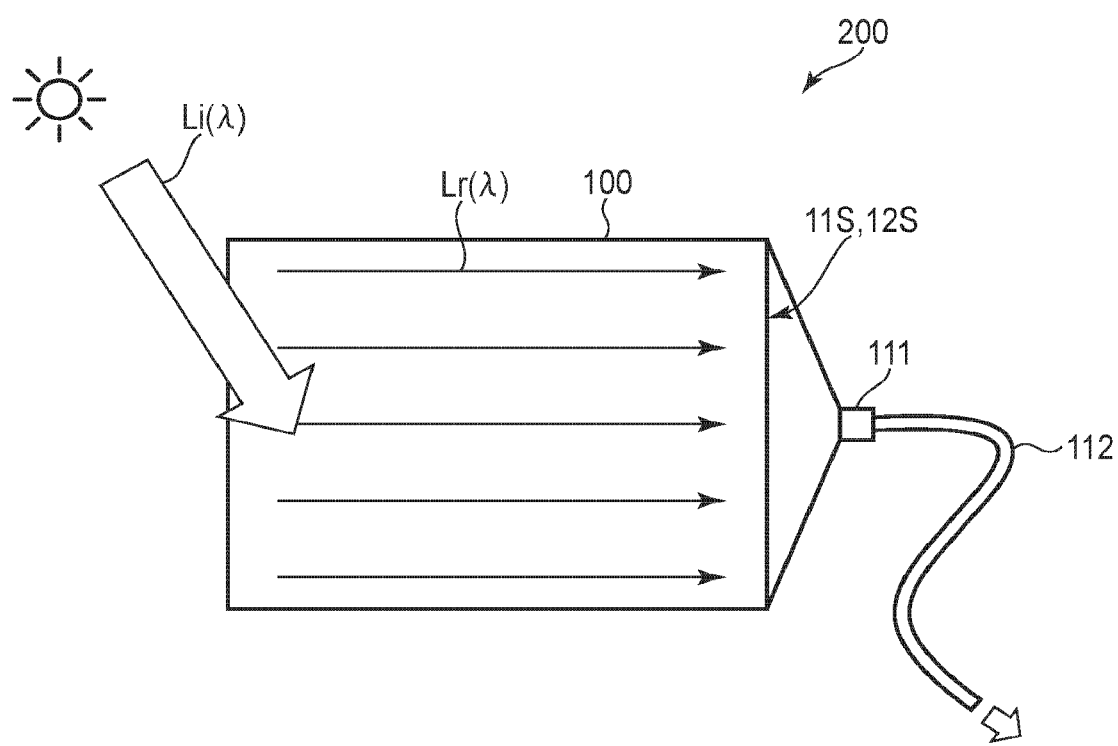
FIG. 15 is a plan view showing the optical system 200 shown in FIG. 14.

FIG. 15 is a plan view showing the optical system 200 shown in FIG. 14.

At least one of the first circularly polarized light C1 and the second circularly polarized light C2, of the incident light Li having a predetermined wavelength $\lambda$ included in the solar light incident on the liquid crystal element 100 becomes the reflected light Lr to propagate the liquid crystal element 100. The reflected light Lr is extracted from the side surface 11S and the side surface 12S and condensed by the condenser 111. The condensed light is output to the optical fiber 112.

Applied Example 2

Figure 16:
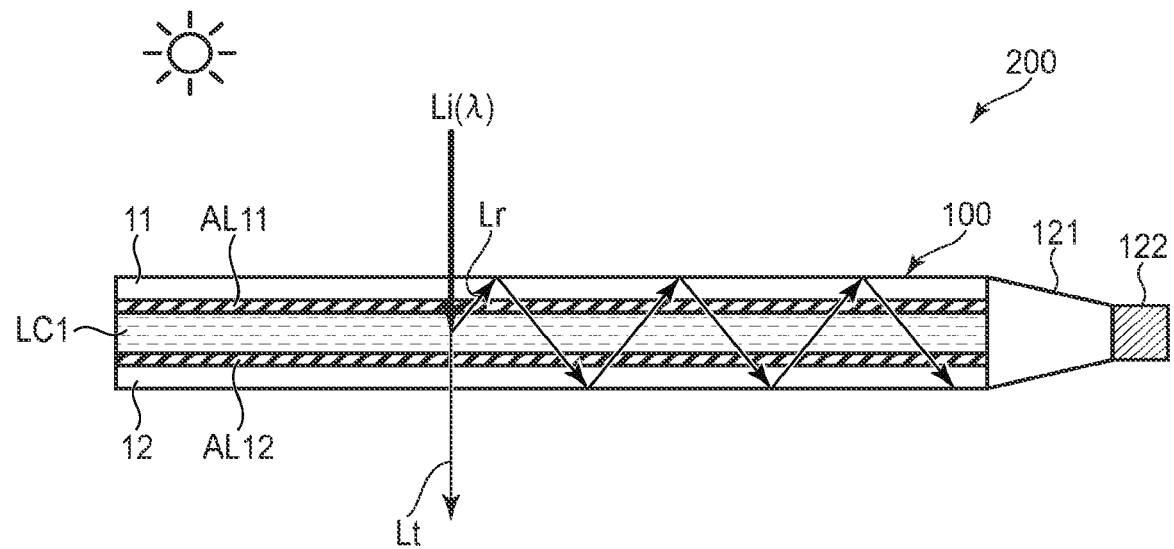
FIG. 16 is a cross-sectional view showing an example of the optical system 200 comprising the liquid crystal element 100.

FIG. 16 is a cross-sectional view showing an example of the optical system 200 comprising the liquid crystal element 100.

The optical system 200 comprises the above-described liquid crystal element 100, a condenser 121, and a photoelectric conversion element 122. The liquid crystal element 100 described herein is an example and any liquid crystal elements 100 described in the above examples may be applied. The condenser 121 is connected to the side surfaces of the liquid crystal element 100, i.e., the side surface 11S of the first transparent substrate 11 and the side surface 12S of the second transparent substrate 12. The photoelectric conversion element 122 is connected to the condenser 121.

Figure 17:
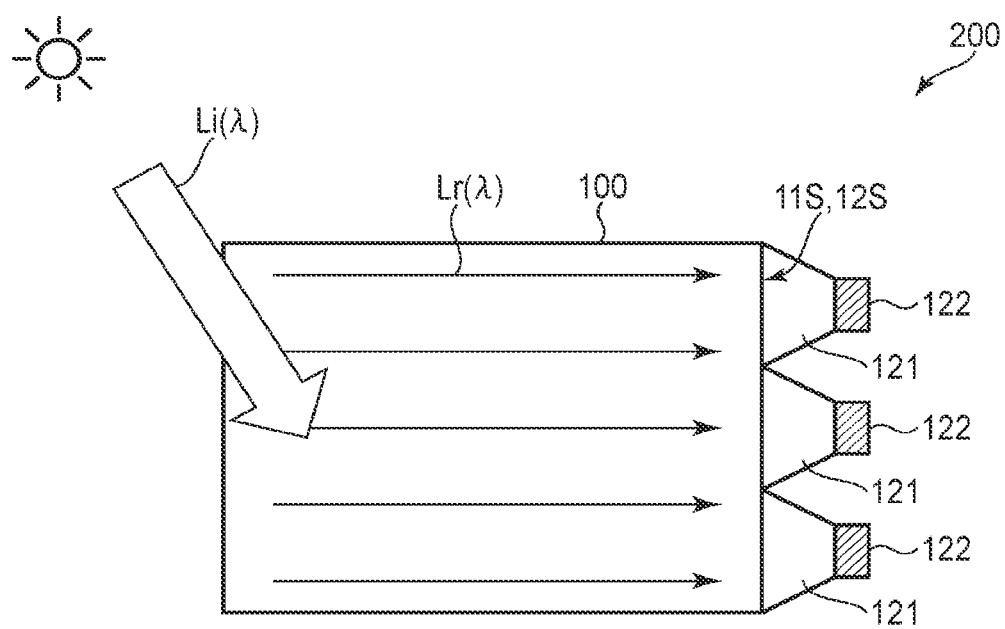
FIG. 17 is a plan view showing the optical system 200 shown in FIG. 16.

FIG. 17 is a plan view showing the optical system 200 shown in FIG. 16.

A plurality of condensers 121 and a plurality of photoelectric conversion elements 122 are arranged along the side surface 11S. The photoelectric conversion elements 122 convert the energy of the received light into an electric power. In other words, the photoelectric conversion elements 122 generate an electric power with the received light. The type of the photoelectric conversion elements 122 is not particularly limited.

At least one of the first circularly polarized light C1 and the second circularly polarized light C2, of the incident light Li having a predetermined wavelength $\lambda$ included in the solar light incident on the liquid crystal element 100 becomes the reflected light Lr to propagate the liquid crystal element 100. The reflected light Lr is extracted from the side surface 11S and the side surface 12S and condensed by the plurality of condensers 121. The condensed light is output to the photoelectric conversion elements 122. The photoelectric conversion elements 122 generate an electric power with the received light.

As described above, according to the embodiments, a liquid crystal element extracting the light of a specific wavelength can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal element comprising:
a first transparent substrate having a first inner surface and a first outer surface;
a first alignment film disposed on the first inner surface;
a second transparent substrate opposed to the first transparent substrate and having a second inner surface and a second outer surface;
a second alignment film disposed on the second inner surface; and
a first liquid crystal layer located between the first alignment film and the second alignment film, and cured in a state in which alignment directions of a plurality of liquid crystal molecules are fixed,
wherein
the first liquid crystal layer contains first cholesteric liquid crystal and has a reflective surface which reflects first circularly polarized light having a first wavelength, of incident light transmitted through the first outer surface,
a first helical axis of the first cholesteric liquid crystal is tilted in a uniform direction over an entire area of the first liquid crystal layer, and
each of the first outer surface and the second outer surface forms an interface which totally reflects the first circularly polarized light reflected in the first liquid crystal layer.

2. The liquid crystal element of claim 1, wherein
a tilt angle of the first helical axis to a boundary between the second alignment film and the first liquid crystal layer is smaller than 69 degrees.

3. The liquid crystal element of claim 1, further comprising:
a third transparent substrate opposed to the second transparent substrate and having a third inner surface and a third outer surface;
a third alignment film disposed on the third inner surface;
a fourth transparent substrate opposed to the third transparent substrate and having a fourth inner surface and a fourth outer surface;
a fourth alignment film disposed on the fourth inner surface; and
a second liquid crystal layer located between the third alignment film and the fourth alignment film, and cured in a state in which alignment directions of a plurality of liquid crystal molecules are fixed,
wherein
the second liquid crystal layer contains second cholesteric liquid crystal and has a reflective surface which reflects second circularly polarized light different from the first circularly polarized light,
a second helical axis of the second cholesteric liquid crystal is tilted in a uniform direction over an entire area of the second liquid crystal layer, and
each of the third outer surface and the fourth outer surface forms an interface which totally reflects the second circularly polarized light reflected in the second liquid crystal layer.

4. The liquid crystal element of claim 3, wherein
a tilt angle of the second helical axis to a boundary between the fourth alignment film and the second liquid crystal layer is equal to a tilt angle of the first helical axis to a boundary between the second alignment film and the first liquid crystal layer, and is smaller than 69 degrees.

5. The liquid crystal element of claim 3, wherein
a turning direction of the second cholesteric liquid crystal is opposite to a turning direction of the first cholesteric liquid crystal,
a helical pitch of the second cholesteric liquid crystal is equal to a helical pitch of the first cholesteric liquid crystal, and
the second circularly polarized light is circularly polarized light in a direction opposite to the first circularly polarized light, of the light having the first wavelength.

6. The liquid crystal element of claim 3, wherein
a helical pitch of the second cholesteric liquid crystal is different from a helical pitch of the first cholesteric liquid crystal, and
the second circularly polarized light is circularly polarized light having a second wavelength different from the first wavelength.

7. A liquid crystal element comprising:
a first transparent substrate having a first inner surface and a first outer surface;
a second transparent substrate having a second inner surface and a second outer surface;
a first liquid crystal layer located between the first transparent substrate and the second transparent substrate, and cured in a state in which alignment directions of a plurality of liquid crystal molecules are fixed; and
a second liquid crystal layer located between the first liquid crystal layer and the second transparent substrate, and cured in a state in which alignment directions of a plurality of liquid crystal molecules are fixed,
wherein
the first liquid crystal layer contains first cholesteric liquid crystal and has a reflective surface which reflects first circularly polarized light having a first wavelength, of incident light transmitted through the first outer surface,
a first helical axis of the first cholesteric liquid crystal is tilted in a uniform direction over an entire area of the first liquid crystal layer,
the second liquid crystal layer contains second cholesteric liquid crystal and has a reflective surface which reflects second circularly polarized light different from the first circularly polarized light,
a second helical axis of the second cholesteric liquid crystal is tilted in a uniform direction over an entire area of the second liquid crystal layer, and
each of the first outer surface and the second outer surface forms an interface which totally reflects each of the first circularly polarized light reflected on the first liquid crystal layer and the second circularly polarized light reflected on the second liquid crystal layer.

8. The liquid crystal element of claim 7, further comprising:

a third transparent substrate opposed to the first transparent substrate and having a third inner surface and a third outer surface;

a fourth transparent substrate opposed to the second transparent substrate and having a fourth inner surface and a fourth outer surface; and an adhesive layer which is in contact with the third outer surface and the fourth outer surface, wherein the first liquid crystal layer is located between the first transparent substrate and the third transparent substrate, and the second liquid crystal layer is located between the second transparent substrate and the fourth transparent substrate.

9. The liquid crystal element of claim 8, further comprising:

a first alignment film disposed on the first inner surface and being in contact with the first liquid crystal layer;

a second alignment film disposed on the second inner surface and being in contact with the second liquid crystal layer;

a third alignment film disposed on the third inner surface and being in contact with the first liquid crystal layer; and a fourth alignment film disposed on the fourth inner surface and being in contact with the second liquid crystal layer.

10. The liquid crystal element of claim 7, further comprising:

a third transparent substrate located between the first liquid crystal layer and the second liquid crystal layer and having a third inner surface and a third outer surface;

a first adhesive layer which is in contact with the first inner surface and the first liquid crystal layer; and a second adhesive layer which is in contact with the third outer surface and the second liquid crystal layer.

11. The liquid crystal element of claim 10, further comprising:

a first alignment film disposed on the third inner surface and being in contact with the first liquid crystal layer; and a second alignment film disposed on the second inner surface and being in contact with the second liquid crystal layer.

12. The liquid crystal element of claim 7, further comprising:

a first alignment film disposed on the first inner surface and being in contact with the first liquid crystal layer;

a second alignment film disposed on the second inner surface and being in contact with the second liquid crystal layer; and an adhesive layer which is in contact with the first liquid crystal layer and the second liquid crystal layer.

* * * * *